US012794947B2

(12) United States Patent
Crabtree et al.

(10) Patent No.: US 12,794,947 B2
(45) Date of Patent: Nov. 10, 2026

(54) AI-ENHANCED SIMULATION AND MODELING EXPERIMENTATION AND CONTROL

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 126 days.

(21) Appl. No.: 18/754,140

(22) Filed: Jun. 25, 2024

(65) Prior Publication Data

US 2024/0348663 A1 Oct. 17, 2024

Related U.S. Application Data

(63) Continuation-in-part of application No. 18/665,577, filed on May 16, 2024.

(51) Int. Cl.

*H04L 9/40* (2022.01)
*G06F 16/2458* (2019.01)
*G06F 16/951* (2019.01)

(52) U.S. Cl.

CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search

CPC . H04L 63/20; H04L 63/1425; H04L 63/1441; G06F 16/2477; G06F 16/951

See application file for complete search history.

(56) References Cited

U.S. PATENT DOCUMENTS 6,256,544 B1 7/2001 Weissinger
7,818,224 B2 10/2010 Boerner (Continued)

FOREIGN PATENT DOCUMENTS

WO 0163534 A2 8/2001
WO 2015094545 A1 6/2015

OTHER PUBLICATIONS

Epistemic Uncertainty in the Ranking and Categorization of Probabilistic Safety Assessment Model Elements: Issues and Findings. (Year: 2008).*

(Continued)

*Primary Examiner* — Yonas A Bayou
(74) *Attorney, Agent, or Firm* — NK Patent Law

(57) ABSTRACT

An artificial intelligence-driven simulation and decision platform for reducing epistemic uncertainty in complex systems. The system integrates advanced techniques from artificial intelligence, simulation, and uncertainty quantification to generate and run scenarios, monitor progress, and adjust parameters in real-time to achieve user-defined goals. The simulation and decision platform comprises an AI system that employs natural language processing, reinforcement learning, and multi-objective optimization; a continuous and scalable simulation environment; scenario generation and guidance that provides human-readable scenario guides and contextual explanations; and an uncertainty quantification and reduction that employs entropy-based methods and Bayesian inference. The system allows users to define goals and objectives for their simulations, and the AI component generates and optimizes scenarios to achieve these goals while reducing epistemic uncertainty. The simulation and decision platform is designed to be flexible and adaptable to various domains and applications, providing a (Continued)

comprehensive and user-friendly solution for managing complex systems under uncertainty.

48 Claims, 18 Drawing Sheets

(56) References Cited

U.S. PATENT DOCUMENTS

| | | | | |
|---|---|---|---|---|
| 7,818,417 | B2 | 10/2010 | Ginis et al. | |
| 7,840,677 | B2 | 11/2010 | Li et al. | |
| 8,069,190 | B2 | 11/2011 | McColl et al. | |
| 8,156,029 | B2 | 4/2012 | Szydlo | |
| 8,352,347 | B2 | 1/2013 | Howard et al. | |
| 8,370,192 | B2 | 2/2013 | Deo et al. | |
| 8,949,084 | B2 | 2/2015 | Baym et al. | |
| 9,077,724 | B2 * | 7/2015 | Moriconi | H04L 63/20 |
| 9,338,061 | B2 | 5/2016 | Chen et al. | |
| 9,461,876 | B2 | 10/2016 | Van Dusen et al. | |
| 9,588,822 | B1 | 3/2017 | Shih et al. | |
| 9,639,575 | B2 | 5/2017 | Leida et al. | |
| 9,679,029 | B2 | 6/2017 | Ayala et al. | |
| 9,721,086 | B2 | 8/2017 | Shear et al. | |
| 9,749,347 | B2 | 8/2017 | Pinney Wood et al. | |
| 9,811,794 | B2 | 11/2017 | Mun et al. | |
| 9,916,133 | B2 | 3/2018 | Jubran et al. | |
| 10,168,691 | B2 | 1/2019 | Zornio et al. | |
| 10,210,246 | B2 | 2/2019 | Stojanovic et al. | |
| 10,386,827 | B2 | 8/2019 | Enver et al. | |
| 10,592,282 | B2 | 3/2020 | Bishop et al. | |
| 10,740,358 | B2 | 8/2020 | Chan et al. | |
| 10,990,714 | B2 | 4/2021 | Martin et al. | |
| 2003/0051054 | A1 * | 3/2003 | Redlich | H04L 63/20 709/206 |
| 2005/0209993 | A1 | 9/2005 | Koehler | |
| 2007/0061393 | A1 * | 3/2007 | Moore | H04L 67/02 709/201 |
| 2007/0102753 | A1 * | 5/2007 | Tang | H10B 10/00 257/E27.099 |
| 2007/0106754 | A1 * | 5/2007 | Moore | G16H 40/20 707/E17.116 |
| 2007/0150965 | A1 * | 6/2007 | Redlich | G06F 21/6209 380/284 |
| 2007/0168370 | A1 | 7/2007 | Hardy | |
| 2007/0174233 | A1 | 7/2007 | Ginis et al. | |
| 2007/0209080 | A1 * | 9/2007 | Ture | G06F 16/951 726/28 |
| 2008/0027690 | A1 | 1/2008 | Watts | |
| 2008/0109883 | A1 * | 5/2008 | Hernoud | G06F 21/602 726/19 |
| 2008/0168135 | A1 * | 7/2008 | Redlich | G06F 21/6254 709/204 |
| 2008/0222734 | A1 * | 9/2008 | Redlich | H04L 9/3271 726/26 |
| 2009/0171999 | A1 | 7/2009 | Mccoll et al. | |
| 2009/0235251 | A1 | 9/2009 | Li et al. | |
| 2013/0262443 | A1 | 10/2013 | Leida et al. | |
| 2013/0290554 | A1 | 10/2013 | Chen et al. | |
| 2015/0186427 | A1 | 7/2015 | Logothetis et al. | |
| 2015/0254330 | A1 | 9/2015 | Chan et al. | |
| 2016/0092557 | A1 | 3/2016 | Stojanovic et al. | |
| 2016/0098037 | A1 | 4/2016 | Zornio et al. | |
| 2016/0171234 | A1 * | 6/2016 | Motoyama | G06F 16/285 726/1 |
| 2016/0275123 | A1 | 9/2016 | Lin et al. | |
| 2016/0358102 | A1 | 12/2016 | Bowers et al. | |
| 2016/0373486 | A1 * | 12/2016 | Kraemer | H04L 63/1433 |
| 2017/0006135 | A1 | 1/2017 | Siebel et al. | |
| 2017/0090893 | A1 | 3/2017 | Aditya et al. | |
| 2019/0155646 | A1 | 5/2019 | Bishop et al. | |

OTHER PUBLICATIONS

Borgonovo, Emanuele, Epistemic Uncertainty in the Ranking and Categorization of Probabilistic Safety Assessment Model Elements: Issues and Findings, Risk Analysis, 2008, 983-1001, No. 4.

* cited by examiner

AI-ENHANCED SIMULATION AND MODELING EXPERIMENTATION AND CONTROL

CROSS-REFERENCE TO RELATED APPLICATIONS

Priority is claimed in the application data sheet to the following patents or patent applications, each of which is expressly incorporated herein by reference in its entirety:

U.S. Ser. No. 18/665,577

BACKGROUND OF THE INVENTION

Field of the Art

The present invention is in the field of computer-aided simulation and modeling, and more particularly to the use of artificial intelligence techniques for improving simulation modeling of real-world systems and aiding in the systematic reduction of epistemic uncertainty across modeling and supporting improved function as a control plane in complex systems.

Discussion of the State of the Art

Epistemic uncertainty refers to the lack of knowledge about a system that can be reduced through the acquisition of additional information. In contrast, aleatoric uncertainty represents the inherent randomness in a system that cannot be reduced by gathering more data. In complex systems, the appropriate utilization of experienced historical information, hypothetical histories (i.e. plausible and/or nearly experienced events), system characteristics such as ergodicity and reflexivity are central to useful modeling. For example, while some natural and man-made systems may be ergodic (i.e., eventually visit all potential system states) others in-fact are non-ergodic and their statistical properties change over time (e.g., in learning human systems where history is studied and aids in evolving behavior).

Simulation and modeling tools are powerful resources for understanding and even optimizing complex systems, but they often suffer from high levels of epistemic uncertainty due to the lack of comprehensive knowledge about the system being modeled. This uncertainty can lead to suboptimal decisions and outcomes, especially in critical domains such as supply chain management, urban planning, and healthcare. This is especially true when reflexive characteristics or highly non-intuitive system dynamics are at play.

What is needed is a platform which addresses these challenges by introducing an AI-driven Simulation and Modeling Experimentation and Control Platform that integrates advanced techniques from artificial intelligence, simulation modeling, and uncertainty quantification to guide users in building more accurate and robust models of real world systems while reducing epistemic uncertainty and suggesting user actions, system settings, or engaging in automation of planning and plan implementation to maximize probabilities of desirable outcomes manifesting

SUMMARY OF THE INVENTION

Accordingly, the inventor has conceived and reduced to practice, an artificial intelligence-driven Simulation and Experimental Design Decision Platform for reducing epistemic uncertainty in complex systems models and enabling system planning, automation and actuation. The system integrates advanced techniques from artificial intelligence, machine learning, simulation, and uncertainty quantification to generate and run scenarios, monitor progress, and adjust parameters in real-time to achieve user-defined goals. The simulation and decision platform comprises an AI system that employs natural language processing, knowledge corpora curation, reinforcement learning, empirical vs simulated scenario and state observation and tracking, dynamic look ahead and branching factor management, and multi-objective optimization; a continuous and scalable simulation environment; scenario generation and guidance that provides human-readable scenario and perturbation guides and contextual explanations; and an uncertainty quantification and reduction that employs multiple approaches, information theory and entropy-based methods, Bayesian statistics, and non-Bayesian or frequentist approaches. The system allows users to define goals and objectives for their simulations, control system operating modes (e.g. ongoing continuous decision support or system control optimization, periodic evaluation, or one-time experiment execution), and the AI component generates and optimizes scenario search and perturbations to achieve these goals while reducing epistemic uncertainty about a modeled system or phenomenon of interest. The Simulation and Experimental Design Decision Platform is designed to be flexible and adaptable to various domains and applications, providing a comprehensive and user-friendly solution for managing complex systems under uncertainty. According to an embodiment, the computing system may engage in express synthetic data generation to identify specific system states, state transitions, agent or entity phenomena or actions (both individual or group), spatio-temporal dynamics, or to explore potential hypotheses for specific causal relationships or symbolic functions (e.g. analytical or numerical). This may include comparative evaluation of symbolic artificial intelligence and connectionist artificial intelligence (or statistical or machine learning approaches) against modeling simulation results or combinations thereof. The system may also probe transition dynamics for the purposes of learning or representing them to aid in modeling or for validation of candidate transition dynamics models or for policy learning such as optimal control, trajectory optimization and planning.

According to a preferred embodiment, a computing system for reducing epistemic uncertainty in complex systems employing an artificial intelligence-driven simulation and experimental design decision platform is disclosed, comprising: one or more hardware processors configured for: generating and running simulation scenarios based on user-defined objectives and constraints, and iteratively adjusting simulation parameters using machine learning techniques to optimize scenario outcomes; providing a scalable and interactive simulation environment that enables real-time monitoring, analysis, and adaptation of a simulated system based on evolving real-world conditions and user feedback; generating human-interpretable insights, explanations, and recommendations based on the simulation results, employing explainable artificial intelligence techniques to facilitate understanding and decision-making; integrating with external data sources, machine learning models, and domain-specific knowledge bases to enhance the accuracy, relevance, and compliance of simulation outcomes; and quantifying and reducing the epistemic uncertainty associated with the simulated system by employing probabilistic reasoning, targeted exploration, and continuous learning from both simulated and real-world data.

According to another preferred embodiment, a computer-implemented method executed on an artificial intelligence-driven simulation and experimental design decision platform for reducing epistemic uncertainty in complex systems is disclosed, the computer-implemented method comprising: generating and running simulation scenarios based on user-defined objectives and constraints, and iteratively adjusting simulation parameters using machine learning techniques to optimize scenario outcomes; providing a scalable and interactive simulation environment that enables real-time monitoring, analysis, and adaptation of a simulated system based on evolving real-world conditions and user feedback; generating human-interpretable insights, explanations, and recommendations based on the simulation results, employing explainable artificial intelligence techniques to facilitate understanding and decision-making; integrating with external data sources, machine learning models, and domain-specific knowledge bases to enhance the accuracy, relevance, and compliance of simulation outcomes; and quantifying and reducing the epistemic uncertainty associated with the simulated system by employing probabilistic reasoning, targeted exploration, and continuous learning from both simulated and real-world data.

According to another preferred embodiment, a system for reducing epistemic uncertainty in complex systems employing an artificial intelligence-driven simulation and experimental design decision platform is disclosed, comprising one or more computers with executable instructions that, when executed, cause the system to: generate and run simulation scenarios based on user-defined objectives and constraints, and iteratively adjusting simulation parameters using machine learning techniques to optimize scenario outcomes; provide a scalable and interactive simulation environment that enables real-time monitoring, analysis, and adaptation of a simulated system based on evolving real-world conditions and user feedback; generate human-interpretable insights, explanations, and recommendations based on the simulation results, employing explainable artificial intelligence techniques to facilitate understanding and decision-making; integrate with external data sources, machine learning models, and domain-specific knowledge bases to enhance the accuracy, relevance, and compliance of simulation outcomes; and quantify and reduce the epistemic uncertainty associated with the simulated system by employing probabilistic reasoning, targeted exploration, and continuous learning from both simulated and real-world data.

According to another preferred embodiment, non-transitory, computer-readable storage media having computer-executable instructions embodied thereon that, when executed by one or more processors of a computing system employing an artificial intelligence-driven simulation and experimental design decision platform for reducing epistemic uncertainty in complex systems, cause the computing system to: generate and run simulation scenarios based on user-defined objectives and constraints, and iteratively adjusting simulation parameters using machine learning techniques to optimize scenario outcomes; provide a scalable and interactive simulation environment that enables real-time monitoring, analysis, and adaptation of a simulated system based on evolving real-world conditions and user feedback; generate human-interpretable insights, explanations, and recommendations based on the simulation results, employing explainable artificial intelligence techniques to facilitate understanding and decision-making; integrate with external data sources, machine learning models, and domain-specific knowledge bases to enhance the accuracy, relevance, and compliance of simulation outcomes; and quantify and reduce the epistemic uncertainty associated with the simulated system by employing probabilistic reasoning, targeted exploration, and continuous learning from both simulated and real-world data.

According to an aspect of an embodiment, the machine learning techniques employed by the simulation and decision platform comprise one or more of: reinforcement learning, multi-objective optimization, transfer learning, and federated learning.

According to an aspect of an embodiment, the one or more hardware processors are further configured for generating and validating simulation scenarios using generative models, such as Generative Adversarial Networks (GANs) or Variational Autoencoders (VAEs), to ensure scenario diversity, realism, and coverage of key system behaviors.

According to an aspect of an embodiment, the explainable artificial intelligence techniques employed by the simulation and decision platform comprise one or more of: feature importance analysis, counterfactual explanations, rule-based reasoning, and visual analytics.

According to an aspect of an embodiment, the one or more hardware processors are further configured for detecting anomalies, outliers, and edge cases in the simulation results using unsupervised learning algorithms, such as clustering or anomaly detection, to identify potential risks, opportunities, or areas of improvement.

According to an aspect of an embodiment, the one or more hardware processors are further configured for: ingesting and preprocessing external data from various formats and sources, such as sensors, databases, application programming interfaces, or user input; aligning and fusing the external data with the simulation model's internal state representation; validating and updating the simulation model's assumptions, parameters, and constraints based on the external data; and exchanging data and insights between the simulation and decision platform and external machine learning models or knowledge bases According to an aspect of an embodiment, the one or more hardware processors are further configured for assisting users in setting up, configuring, and interpreting the simulation scenarios and results through an interactive user interface that provides guided workflows, contextual help, and natural language processing capabilities.

According to an aspect of an embodiment, the quantification and reduction of epistemic uncertainty comprises: representing the uncertainty in the simulation model's parameters, structure, and predictions using probability distributions or fuzzy sets; updating the uncertainty estimates based on the observed simulation results and real-world data using Bayesian inference or belief propagation; identifying the most informative scenarios or experiments to run using active learning, Bayesian optimization, or information-theoretic measures; and adapting the simulation model's complexity, granularity, or scope based on the uncertainty reduction goals and computational constraints According to an aspect of an embodiment, the one or more hardware processors are further configured for enabling collaborative development, sharing, and reuse of simulation scenarios, models, and insights across multiple users, domains, and organizations, while ensuring data privacy, security, and compliance with relevant regulations and policies.

According to an aspect of an embodiment, the simulation and decision platform is deployed on a distributed computing infrastructure, such as cloud platforms or high-performance computing clusters, to enable scalable, fault-tolerant, and efficient execution of complex simulation workloads.

According to an aspect of an embodiment, the system may also be deployed across a separated heterogeneous computing environment such as a mix of cloud resources, edge computing devices, content delivery networks or equivalent, end-user computers (e.g. laptops or workstations), mobile devices, wearables, robotics platforms.

According to an aspect of an embodiment, the one or more hardware processors are further configured for: dynamically modulate forward search methods and select appropriate look ahead depth and branching factors based on current system state, current system objectives, and available resources; and conduct trajectory optimization identification.

According to an aspect of an embodiment, the one or more hardware processors are further configured for suggest analytical formulations or proofs for equations that describe relationships between simulated and observed entities and phenomena.

BRIEF DESCRIPTION OF THE DRAWING FIGURES

DETAILED DESCRIPTION OF THE INVENTION

Figure 1:
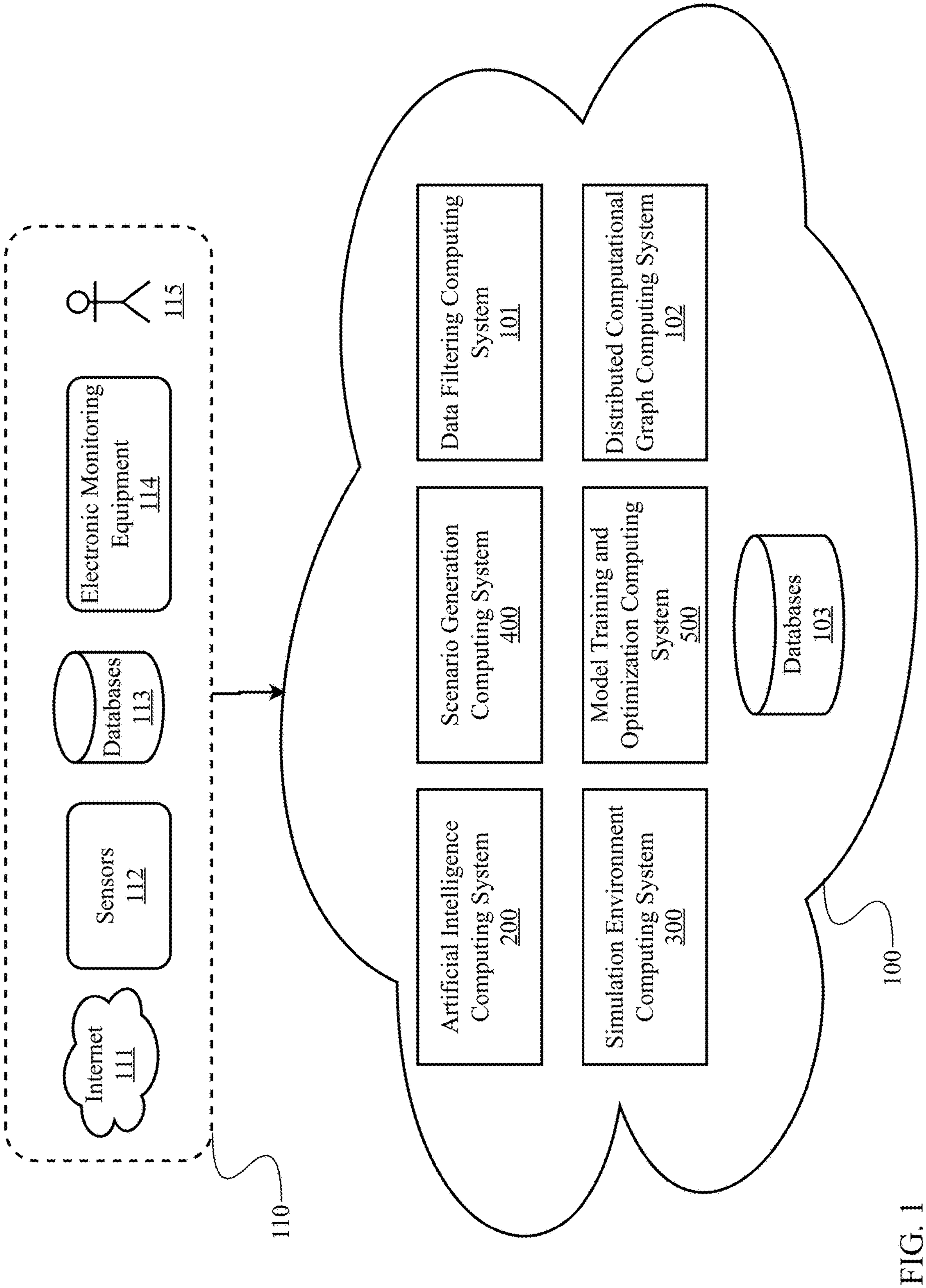
FIG. 1 is a block diagram illustrating an exemplary system architecture for a Simulation and Experimental Design Decision Platform for reducing epistemic uncertainty.

The inventor has conceived, and reduced to practice, an artificial intelligence-driven simulation and decision platform for reducing epistemic uncertainty in complex or reflexive systems. The system integrates advanced techniques from statistical modeling, machine learning, artificial intelligence, simulation, and uncertainty quantification to generate and run scenarios, monitor progress, and adjust parameters in real-time to achieve user-defined goals. The simulation and decision platform comprises an AI system that employs natural language processing, reinforcement learning, and multi-objective optimization; a continuous and scalable simulation environment; scenario generation and guidance that provides human-readable scenario guides and contextual explanations; and an uncertainty quantification and reduction that employs entropy-based methods and Bayesian inference. The system allows users to define goals and objectives for their simulations, and the AI component generates and optimizes scenarios to achieve these goals while reducing epistemic uncertainty. The simulation and decision platform is designed to be flexible and adaptable to various domains and applications, providing a comprehensive and user-friendly solution for managing complex systems under uncertainty.

According to an aspect, the system's ability to generate synthetic data sets from simulated data, machine learning and AI and generative AI models, statistical models and empirical observations (including adjusted/smoothed/augmented) can enable improved experimental design and in particular evaluation of information gain potential from uncertainty reduction efforts, to include real world and synthetic experiments for predictive value, experimental design value (e.g., drug or molecule or materials or quantum or diagnostic research) or for suggesting potential proofs or analytical solutions via symbolic models that might be evaluated for fit. The simulation and decision platform can suggest analytical formulations or proofs for equations that describe relationships between simulated and observed entities and phenomena. This unlocks innovation cycles where human and machine experimental design and validation can be both more effective and more targeted to drive superior economics in both theoretical and empirical research alongside targeted confirmatory functional or applied research initiatives in challenging domains like engineering, biology, chemistry and math. This builds on principles demonstrated from mathematics proof development between expert groups and AI systems which are narrowly focused, such as the elliptic curve murmurations discoveries. For example, the system may be able to train an AI model that leverages expensive simulations (e.g., in fluid-structure interaction (FSI) which requires finite element analysis as well as numerical solutions to Navier-Stokes equations), but the resulting data sets, states, and experimental data may allow for the development of a much more efficient and approximate algorithm (e.g., as a large language model or as some other AI model like a liquid neural network) that can act as a lossy compressed version of the overall amassed corpus of problem-specific data.

According to an embodiment, the simulation and decision platform may engage in express synthetic data generation to identify specific system states, state transitions, agent or entity phenomena or actions (both individual or group), spatio-temporal dynamics, or to explore potential hypotheses for specific causal relationships or symbolic functions. This may include comparative evaluation of symbolic artificial intelligence and connectionist artificial intelligence (or statistical or machine learning approaches) against modeling simulation results.

According to an embodiment, the simulation and decision platform can be integrated with robotic systems and used for embodied AI applications such as generating and updating plans for collaborative robots in warehouse operations, manufacturing operations, or healthcare settings. According to an embodiment, the simulation and decision platform can be used for embodied AI applications where the entire (or partial) system is integrated into robotic devices or robot fleet management systems. For example, the platform can generate and periodically update plans specified in action notation modeling language (ANML) for collaborative robots (cobots) running on a Robot Operating System 2 (ROS2) or similar operating system. This enables the real-time optimization and adaptation of robot plans and behaviors in real-world environments such as warehouse operations, manufacturing operations, or healthcare facilities based on simulation results and the reduction of epistemic uncertainty.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "explainability" (also referred to as "interpretability") is the concept that a machine learning model and its output can be explained in a way that "makes sense" to a human being at an acceptable level.

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall," "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph=(Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within a transformation pipeline are represented as a directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships and node types. It is also important to note that the resource topologies available at a given execution time for a given pipeline may be highly dynamic due to changes in available node or edge types or topologies (e.g. different servers, data centers, devices, network links, etc.) being available, and this is even more so when legal, regulatory, privacy and security considerations are included in a DCG pipeline specification or recipe in the DSL. Since the system can have a range of parameters (e.g. authorized to do transformation x at compute locations of a, b, or c) the JIT, JIC, JIP elements can leverage system state information (about both the processing system and the observed system of interest) and planning or modeling modules to compute at least one parameter set (e.g. execution of pipeline may say based on current conditions use compute location b) at execution time. This may also be done at the highest level or delegated to lower level resources when considering the spectrum from centralized cloud clusters (i.e. higher) to extreme edge (e.g. a wearable, or phone or laptop). The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "pipeline," as used herein and interchangeably referred to as a "data pipeline" or a "processing pipeline," refers to a set of data streaming activities and batch activities. Streaming and batch activities can be connected indiscriminately within a pipeline and compute, transport or storage (including temporary in-memory persistence such as Kafka topics) may be optionally inferred/suggested by the system or may be expressly defined in the pipeline domain specific language. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, a certain data size or chunk, or optionally an internal (e.g. APM or trace or resource based trigger) or external trigger (e.g. from another user, pipeline, or exogenous service). The events are held in a queue (e.g. Kafka) or similar until processing. Each batch activity may contain a "source" data context (this may be a streaming context if the upstream activities are streaming), and a "destination" data context (which is passed to the next activity). Streaming activities may sometimes have an optional "destination" streaming data context (optional meaning: caching/persistence of events vs. ephemeral). System also contains a database containing all data pipelines as templates, recipes, or as run at execution time to enable post-hoc reconstruction or re-evaluation with a modified topology of the resources (e.g. compute, transport or storage), transformations, or data involved.

"Epistemic uncertainty" as used herein and interchangeably referred to as "systemic uncertainty" refers to unknown factors that can be known or predicted given the proper information, and thus can be accounted for in simulated scenarios to reduce variation in outcomes and arrive at an optimal result for any given set of input data. The application contrasts this with aleatory uncertainty (also called statistical uncertainty), which refers to unknown factors that change each time a scenario is run and generally cannot be known or predicted. An example given of epistemic uncertainty is the effect of air resistance on a falling object. The acceleration of a falling object is often expressed as a fixed value, when in fact it varies slightly due to air resistance. This air resistance is an example of epistemic uncertainty, because it is a factor that could be known and accounted for in modeling the scenario, even though it is often ignored.

Conceptual Architecture

FIG. 1 is a block diagram illustrating an exemplary system architecture for a Simulation and Experimental Design Decision Platform 100 for reducing epistemic uncertainty, according to an embodiment. According to the embodiment, the simulation and decision platform allows users to define goals and objectives for their simulations, and an AI component generates and optimizes scenarios to achieve these goals while reducing epistemic uncertainty in complex (including non-ergodic and reflexive variants) systems. The system provides real-time guidance and explanations to help users understand the implications of their decisions and ensures compliance with relevant regulations and guidelines. The AI-driven simulation and decision integrates various AI and simulation techniques to create a comprehensive and user-friendly solution for quantifying and reducing epistemic uncertainty in complex systems.

According to the embodiment, platform 100 is configured as a cloud-based computing platform comprising various system or sub-system components configured to provide functionality directed to the execution of epistemic uncertainty quantification and reduction using simulations and an AI system to provide guidance and support. According to the embodiment, the system architecture comprises the following main components: an artificial intelligence computing system 200, a simulation environment computing system 300, a scenario generation computing system 400, a model training and optimization computing system 500, a data filtering computing system 101, a distributed computational graph (DCG) computing system 102, and one or more databases 103. In some embodiments, systems 101-103, and 200-500 may each be implemented as standalone software applications or as a services/microservices architecture which can be deployed (via platform 100) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker and orchestrated using container orchestration platforms like Kubernetes. This allows for easier deployment and management of services.

According to the embodiment, a variety of input data sources 110 may provide data for use in transformation pipelines by a distributed computation graph computing system 102. According to the embodiment, input data sources 110 may be a variety of data sources which may include but are not limited to the Internet 111, arrays of physical sensors 112, database servers 113, electronic monitoring equipment 114, and direct human interaction 115 ranging from a relatively few number of participants to a large crowd sourcing campaign. Streaming data from any combinations of listed sources and those not listed may also be expected to occur as part of the operation of the invention as the number of streaming input sources is not limited by the design. All incoming streaming data may be passed through data filtering computing system 101 to remove information that has been damaged in transit, is misconfigured, or is malformed in some way that precludes use.

After filtering, data may be provided to DCG computing system 102 for processing through a plurality of transformation pipelines, to correlate real-world scenario conditions with outcomes and then determine initial conditions for scenarios to be simulated to predict future outcomes. simulation conditions may then be sent to simulation environment computing system 300 for use in simulating scenarios using the provided conditions and then producing a simulated outcome that may then be provided to the data filter computing system 101 for use as predictions of real-world outcomes in scenarios with similar starting conditions. As operation continues, predicted outcomes may be compared against real-world recorded outcomes using the DCG computing system 102, removing epistemic uncertainty through the collecting and analysis of data over time and thus narrowing the confidence interval of predictions and improving the simulation results to predict outcomes more accurately.

According to the embodiment, artificial intelligence computing system 200 is present and configured to utilize large language models (LLMs) for natural language processing (NLP) and understanding to aid users with simulation and modeling. AI computing system 200 may employ generative models such as, for example, generative adversarial networks (GANs) and variational autoencoders (VAEs) for scenario generation. In some aspects, AI computing system 200 can implement reinforcement learning for real-time parameter adjustment and optimization. Furthermore, AI computing system may incorporate multi-objective algorithms (e.g., NSGA-II, MOEA/D) for goal oriented optimization.

According to the embodiment, simulation environment computing system 300 is present and configured to support continuous and scalable simulation with real-time parameter adjustment. In some aspects, simulation system 300 utilizes streaming data processing frameworks (e.g., Apache Kafka, Flink, etc.) for efficient data handling and may further implement low-latency communication protocols (e.g., MQTT, CoAP, etc.) for real-time feedback loops. In some embodiments, simulation system 300 may incorporate data assimilation techniques (e.g., Kalman filters, particle filters) for integrating real-world data with simulation and/or models.

According to the embodiment, scenario generation computing system 400 is present and configured to provide human-readable scenario guides using explainable AI (XAI) techniques (e.g., LIME, SHAP) and generate contextual explanations and warnings using LLM/NLP models (e.g., GPT-3, BERT, etc.). In some implementations, scenario generation computing system 400 can detect potential issues using anomaly detection algorithms (e.g., isolation forests, autoencoders, etc.). In some embodiments, scenario generation system 400 can be configured to offer recommendations based on expert knowledge bases and case-based reasoning.

According to an embodiment, XAI techniques may comprise feature importance analysis. Feature importance analysis is a technique used in explainable AI to determine the relative contribution or significance of each input feature in influencing the output or predictions of a machine learning model. It helps identify which features have the greatest impact on the model's behavior and can provide insights into the underlying relationships and dependencies in the data. The simulation models used in the platform often have numerous input parameters and variables that influence the simulation outcomes. Feature importance analysis can be applied to these models to identify the key drivers and sensitive parameters that have the greatest impact on the simulation results. Techniques such as sensitivity analysis, partial dependence plots, or permutation importance can be used to quantify the importance of each input parameter. For example, in a supply chain simulation model, feature importance analysis can reveal that factors like transportation costs, inventory levels, and demand variability have a significant impact on the overall performance metrics. The AI components of the simulation and decision platform, such as the machine learning models used for prediction, optimization, or anomaly detection, also rely on input features to make decisions. Feature importance analysis can be applied to these AI models to understand which features contribute the most to their predictions or decisions. Techniques like permutation importance, SHAP (SHapley Additive explanations), or LIME (Local Interpretable Model-agnostic Explanations) can be used to quantify the importance of each feature. For instance, in a demand forecasting model used within the simulation and decision platform, feature importance analysis can show that historical sales data, promotional activities, and weather conditions are the most influential factors in predicting future demand.

According to the embodiment, model training and optimization computing system 500 is present and configured to integrate with machine learning operations (MLOps) and model training systems for efficient model management. Model training and optimization system 500 may support federated learning with secure aggregation protocols and incentive mechanisms, according to some embodiments. Additionally, or alternatively, the system can implement transfer learning using, for example, domain adaption techniques and few-shot learning methods. In some implementations, model training and optimization system 500 can provide regulatory compliance assistance with contextual warnings and suggested remedies.

According to various embodiments, platform 100 utilizes a plurality of techniques that can be used to aid in quantifying and reducing epistemic uncertainty. A first technique which can be used comprises data analytics. Advanced data analytics techniques can be used to process and derive insights from the large amounts of data that serve as inputs to the system. This could involve techniques such as data mining, machine learning, statistical modeling, and predictive analytics. These techniques can help identify patterns, correlations, and trends in the data that can inform a model's initial conditions and guide its refinement.

A second technique comprises agent-based modeling. Agent-based modeling is a computational modeling paradigm where a system is modeled as a collection of autonomous decision-making entities called agents. Each agent individually assesses its situation and makes decisions based on a set of rules. This allows for modeling of complex systems where the behavior emerges from the interactions of many individual entities. In the context of the platform 100, agent-based modeling could be used to simulate the complex interactions within the system being modeled, providing a more realistic and nuanced simulation.

Another method for analyzing epistemic uncertainty comprises discrete event simulation. Discrete event simulation is a type of simulation where the operation of a system is represented as a chronological sequence of events. Each event occurs at a particular instant in time and marks a change of state in the system. Between consecutive events, no change in the system is assumed to occur. This type of simulation can be useful for modeling complex systems where events occur at irregular intervals and the state of the system needs to be tracked over time.

An additional method for analyzing epistemic uncertainty comprises the mathematics of entropy. Entropy is a concept from physics and information theory that relates to the amount of uncertainty or randomness in a system. In information theory, entropy quantifies the expected value of the information contained in a message. Techniques from the mathematics of entropy could be used to quantify and model the uncertainty in the system. This could potentially involve techniques such as maximum entropy modeling, which seeks to find the probability distribution that has maximum entropy subject to known constraints. By modeling the uncertainty in the system using entropy, it may be possible to better understand and reduce that uncertainty.

These are just a few examples of how these various techniques could be applied in the context of the platform described herein. The specifics would depend on the particular domain and the nature of the system being modeled. The overarching idea is to leverage advanced techniques from various fields to better model, understand, and reduce the epistemic uncertainty in complex systems.

Although not shown in the illustrated embodiment, a user interface (UI) which can provide a user experience (UX) may be present and configured to provide a user-friendly and intuitive way for users to interact with the platform, input necessary information, and visualize the simulation results and insights. The user interface may allow users to set up and configure the simulation environment based on their specific requirements and goals. This may involve the following inputs: simulation scenario definition wherein users would input the details of the simulation scenario they want to run, such as the type of system being modeled (e.g., grocery store, supply chain, transportation network), the geographic scope, and the time period; model selection wherein users would choose the appropriate simulation models or templates from a predefined library (e.g., model database 505) or have the option to customize and create new models based on their specific needs; parameter configuration wherein users may input the initial parameters and assumptions for the simulation, such as customer arrival rates, service times, resource constraints, and other relevant factors while also providing intuitive controls and default values to assist users in setting up the parameters; and data input wherein users can have the option to upload or connect relevant data sources, such as historical sales data, customer profiles, or external datasets or knowledge bases, to inform the simulation models and improve their accuracy.

The UI may be configured to display various outputs such as a summary of the simulation setup, including the selected scenario, models, parameters, and data sources. Additionally, the UI may display visual representations of the simulation environment, such as a map or a process flow diagram, to help users understand the scope and components of the simulation. Once the simulation is set up, the user interface can provide controls to execute the simulation and monitor its progress in real-time. This can include inputs such as start, pause, and stop controls for the simulation execution; options to adjust simulation speed and granularity; and the ability to introduce real-time events or interventions during the simulation run. Outputs can include real-time visualization of the simulation progress, such as animated graphics or dashboard-style displays showing key performance indicators (KPIs) and system states; alerts and notifications for significant events, anomalies, or threshold breaches during the simulation; and logging and tracking of simulation events and decisions for later analysis and auditing.

After a simulation run is completed, the user interface can present the results and insights generated by the simulation and decision platform. This can include outputs such as a summary of the simulation results, including key metrics, performance indicators, and outcomes; visual representations of the simulation outcomes, such as charts, graphs, heat maps, or interactive dashboards; comparative analysis of different scenarios or parameter variations to identify the impact of different decisions or interventions; insights and recommendations generated by the AI-driven analysis, highlighting potential optimizations, risks, or opportunities; and explanations and interpretations of the simulation results, providing context and rationale for the observed outcomes.

The user interface can be configured to facilitate collaboration and sharing of simulation results and insights among team members and stakeholders. This can involve input options to save, export, and share simulation setups, results, and reports; collaboration features, such as commenting, annotating, and discussing simulation outcomes within the platform; access control and permission settings to manage user roles and data visibility. Collaborative user interface outputs can include shared workspaces or project folders for team collaboration; notification and update mechanisms to keep team members informed about simulation progress and changes; and integration with communication and project management tools for seamless information sharing and coordination.

The user interface can incorporate user assistance and guidance features to support users in effectively utilizing the simulation and decision platform. This can include contextual help and tooltips to explain the functionality and inputs required at each step of the simulation process; guided workflows and wizards to walk users through complex simulation setup or analysis tasks; recommendations and best practices based on the user's simulation goals and the characteristics of the system being modeled; and chatbot or virtual assistant functionality to answer user queries and provide guidance on simulation-related topics.

According to various embodiments, platform 100 can utilize the functionality of the uncertainty quantification and reduction, along with the integration of probabilistic reasoning techniques into the AI component and the simulation environment. This may comprise representing uncertainty in the simulation model's parameters, structure, and predictions. The AI component can be extended to represent uncertainty using probability distributions or fuzzy sets. For parameter uncertainty, the AI component can assign probability distributions (e.g., Gaussian, uniform) to the model parameters, capturing the range and likelihood of different parameter values. For structural uncertainty, the AI component can employ techniques like Bayesian model averaging or ensemble learning to consider multiple alternative model structures and assign probabilities to each structure. For prediction uncertainty, the AI component can generate probabilistic outputs (e.g., confidence intervals, probability distributions) instead of point estimates, reflecting the uncertainty in the model's predictions.

Figure 2:
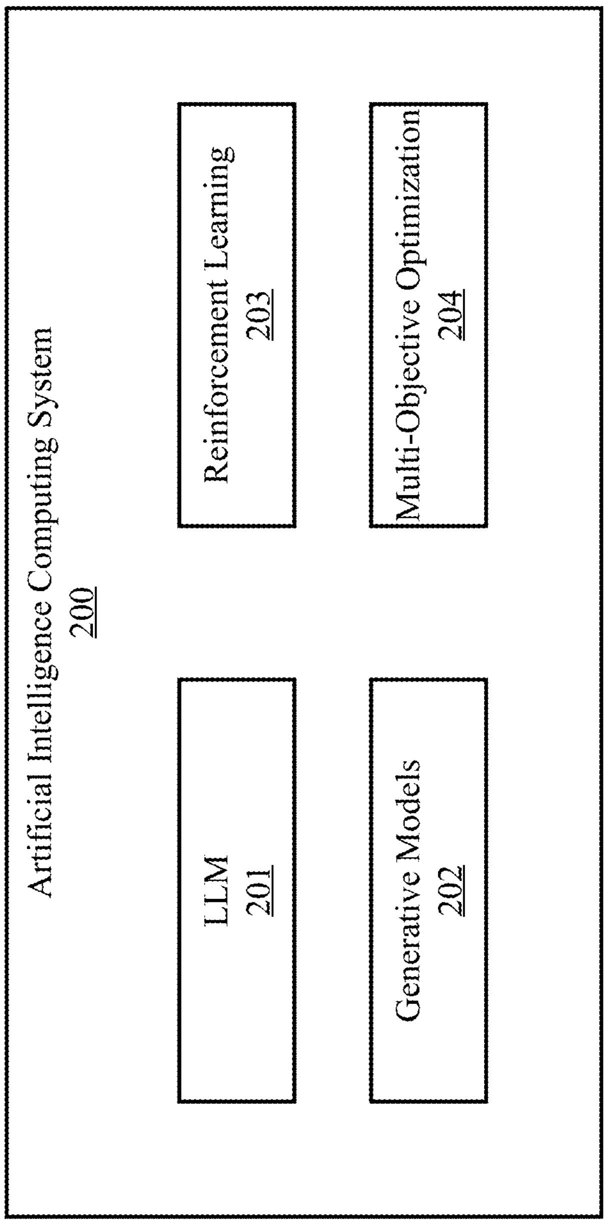
FIG. 2 is a block diagram illustrating an exemplary aspect of a Simulation and Experimental Design Decision Platform, an artificial intelligence computing system.

According to various embodiments, platform 100 can update uncertainty estimates based on observed simulation results and real-world data. The integration of the simulation environment with real-world data sources and the continuous learning capabilities of the AI component enables the updating of uncertainty estimates. As new simulation results and real-world data become available, the AI component can use Bayesian inference techniques (e.g., Markov Chain Monte Carlo, variational inference) to update the probability distributions of the model parameters and structure. The updated uncertainty estimates can be propagated through the simulation model using techniques like belief propagation or Monte Carlo sampling to obtain updated prediction uncertainties According to various embodiments, platform 100 can be configured to identify the most informative scenarios or experiments to run. The AI component can employ active learning techniques to identify the most informative scenarios or experiments that reduce the epistemic uncertainty the most. This can involve using acquisition functions (e.g., expected improvement, upper confidence bound) to balance exploration and exploitation in the scenario selection process. The AI component can also leverage information-theoretic measures (e.g., entropy, mutual information) to quantify the expected information gain from running specific scenarios or experiments. The selected scenarios can be generated and executed in the simulation environment, and the results can be used to update the uncertainty estimates and refine the scenario selection process iteratively According to various embodiments, platform 100 can be configured to adapt the simulation model's complexity, granularity, or scope. The AI component can monitor the uncertainty reduction progress and the computational resources consumed by the simulation runs. Based on the uncertainty reduction goals and the available computational budget or constraints (e.g., time, compute or storage resources, network conditions or availability or costs), the AI component can decide to adapt the simulation model's complexity, granularity, or scope. This can involve techniques like model pruning (removing unnecessary components), model abstraction (simplifying the model structure), or multi-fidelity modeling (using models with different levels of detail). The adapted simulation models can be executed in the simulation environment, and the results can be compared with the original models to assess the trade-offs between uncertainty reduction and computational efficiency FIG. 2 is a block diagram illustrating an exemplary aspect of a Simulation and Experimental Design Decision Platform, an artificial intelligence computing system 200. According to the aspect, AI computing system 200 is responsible for generating and running scenarios, monitoring progress, and adjusting parameters to achieve user-defined goals. This component leverages advanced techniques from artificial intelligence, such as natural language processing (NLP), reinforcement learning (RL), and multi-objective optimization.

AI computing system 200 utilizes large language models 201 for natural language processing and understanding. LLMs, such as GPT-3, BERT, or domain-specific models, are trained on vast amounts of text data and can understand and generate human-like text. In various embodiments of the simulation and decision platform, LLMs may be used for interpreting user requirements and goals; users can input their objectives and constraints for the simulation in natural language. The AI component uses NLP techniques to extract relevant information, such as key performance indicators (KPIs), decision variables, and constraints, from the user's input. For example, a user inputs, "Minimize the average waiting time for customers in a grocery store while ensuring that the total staff cost does not exceed $5000 per day." The AI component identifies the objective (minimize average waiting time), the decision variable (number of staff), and the constraint (total staff cost <=$5000/day). LLMs 201 can be further used for generating human-readable scenario descriptions. The AI component can generate textual descriptions of the scenarios it creates, making them more understandable and interpretable for users. As an example, the AI component generates a scenario for the grocery store simulation and describes it as follows: "In this scenario, the store operates with 10 cashiers and 5 re-stockers. The average customer arrival rate is 30 per hour, and the average checkout time is 3 minutes. The restocking time for each item is 2 minutes."

According to the aspect, AI computing system 200 can utilize generative models 202, such as Generative Adversarial Networks (GANs) and Variational Autoencoders (VAEs), to create realistic and diverse scenarios for the simulation. Generative models are a class of machine learning techniques that learn to generate new data samples that resemble the training data distribution.

Generative models may be used for scenario generation. GANs and VAEs can be trained on historical data or domain-specific datasets to generate new scenarios that capture the relevant characteristics and patterns of the system being modeled. The generated scenarios can be used to augment the existing data, explore potential future states, or test the robustness of the simulation under different conditions. As an example, in the grocery store simulation, a GAN can be trained on historical data of customer arrival rates, checkout times, and restocking times. The trained GAN can then generate new scenarios by sampling from the learned distribution. These generated scenarios can represent different customer behavior patterns, staffing levels, and operational conditions that may not have been observed in the historical data but are plausible and realistic. The scenario generation process using GANs typically involves the following steps: a. Data preparation: Collect and preprocess historical data related to the system being modeled, such as customer arrival rates, checkout times, and restocking times in the grocery store example. b. GAN training: Train a GAN on the preprocessed data. The GAN consists of two neural networks: a generator and a discriminator. The generator learns to create new scenarios that resemble the real data, while the discriminator learns to distinguish between real and generated scenarios. The two networks are trained simultaneously in an adversarial manner until the generator can create scenarios that are indistinguishable from the real data. c. Scenario sampling: Once the GAN is trained, new scenarios can be generated by sampling from the generator network. The generated scenarios will capture the patterns and characteristics learned from the historical data. d. Scenario evaluation and selection: The generated scenarios can be evaluated based on various criteria, such as realism, diversity, and relevance to the simulation objectives. The most promising scenarios can be selected for further analysis or integration into the simulation.

Another use case for generative models 202 is for counterfactual scenario generation. Generative models can also be used to create counterfactual scenarios, which represent "what-if" situations that deviate from the observed data. Counterfactual scenarios are useful for exploring the potential impact of interventions, policy changes, or rare events on the system being modeled. For example, in the grocery store simulation, a VAE can be trained on historical data to learn a compressed representation (latent space) of the system's behavior. By manipulating the latent variables, the VAE can generate counterfactual scenarios that exhibit desired properties or reflect specific interventions. For instance, one could generate scenarios with increased customer arrival rates to study the impact on waiting times and staff utilization. The counterfactual scenario generation process using VAEs involves the following steps: a. Data preparation: Collect and preprocess historical data related to the system being modeled. b. VAE training: Train a VAE on the preprocessed data. The VAE consists of an encoder network that maps the input data to a lower-dimensional latent space and a decoder network that reconstructs the original data from the latent representation. The VAE is trained to minimize the reconstruction loss and regularize the latent space to follow a prior distribution (e.g., a standard Gaussian distribution). c. Latent space manipulation: Once the VAE is trained, counterfactual scenarios can be generated by manipulating the latent variables. This can be done by specifying desired changes in the latent space (e.g., increasing or decreasing certain latent variables) or by optimizing the latent variables to satisfy specific constraints or objectives. d. Scenario decoding: The manipulated latent variables are passed through the decoder network to generate counterfactual scenarios. The decoder network maps the modified latent representation back to the original data space, creating scenarios that incorporate the desired changes.

According to an aspect, generative models 202 can be further leveraged to provide scenario refinement and adaptation. Generative models can be used to refine and adapt scenarios based on user feedback or real-time data. By fine-tuning the generative models with new data or user preferences, the AI component can create scenarios that are more relevant, realistic, and aligned with the evolving needs of the simulation. As an example, in the grocery store simulation, user feedback might indicate that the generated scenarios do not accurately capture certain peak hours or customer behavior patterns. The AI component can fine-tune the GAN or VAE with additional data or user-provided examples to improve the quality and relevance of the generated scenarios. This iterative refinement process allows the simulation and decision platform to adapt to changing requirements and incorporate domain expertise.

The integration of generative models in the AI component enables the simulation and decision platform to create a wide range of realistic and diverse scenarios, explore counterfactual situations, and adapt to user feedback and real-time data. By leveraging the power of GANs, VAEs, and other generative techniques, the AI component can enhance the effectiveness and flexibility of the simulation, ultimately leading to better decision-making and reduced epistemic uncertainty.

It's important to note that the success of generative models in the simulation and decision platform depends on the availability and quality of the training data, as well as the careful design and tuning of the model architectures. The AI computing system 200 may also incorporate appropriate evaluation metrics and validation techniques to ensure the generated scenarios are meaningful, coherent, and aligned with the simulation objectives.

According to an aspect, the generative models 202 may be configured to generate executable robot plans. According to another aspect, the generative models 202 can be configured to generate various synthetic data sets from simulated data, machine learning and AI and generative AI models, statistical models, and empirical observations (including adjusted/smoothed/augmented).

Furthermore, the simulation and decision platform can benefit from the integration of domain knowledge and expert guidance in the scenario generation process. This can be achieved by incorporating prior knowledge into the generative models, using domain-specific loss functions or constraints, or involving human experts in the evaluation and selection of generated scenarios.

AI computing system 200 may utilize reinforcement learning (RL) techniques 203. Reinforcement learning is a type of machine learning where an agent learns to make decisions by interacting with an environment. The agent receives rewards or penalties based on its actions and aims to maximize its cumulative reward over time. In the simulation and decision platform 100, RL may be used for real-time parameter adjustment wherein the AI component acts as an RL agent, observing the state of the simulation and taking actions to adjust parameters in real-time. The agent learns from the feedback it receives in the form of rewards (e.g., improvement in KPIs) or penalties (e.g., violation of constraints). For example, in the grocery store simulation, the RL agent observes the average waiting time and staff cost at regular intervals. If the waiting time exceeds a certain threshold, the agent decides to increase the number of cashiers. If the staff cost exceeds the budget, the agent reduces the number of cashiers or re-stockers. The agent learns to balance the competing objectives over time. Reinforcement learning 203 may also be used for adaptive sampling and scenario selection. The AI component uses RL techniques, such as multi-armed bandit algorithms or Bayesian optimization, to adaptively select the most informative scenarios to run based on their expected value of information. For example, the AI system maintains a set of candidate scenarios with different parameter settings. It selects the next scenario to run based on a combination of exploration (trying new scenarios) and exploitation (focusing on scenarios that have performed well in the past). As the simulation progresses, the AI component updates its beliefs about the value of each scenario and adapts its sampling strategy accordingly. The AI component can dynamically modulate forward search methods (e.g., Cross Entropy Method (CES), CMA-ES, MCTS, MCTS+RL, or UCT) and select appropriate look ahead depth and branching factors based on current system state, current system objectives, and available resources (e.g., compute, storage, energy, time available). It can also conduct trajectory optimization identification (e.g., with or without derivatives and via action only like the shooting method vs. collocation method with actions, constraints, and states). System can support custom functions, agents, rules, or equation based specifications that may also optionally utilize Probabilistic Programming Languages for efficiency and understandability like Figaro in Scala.

AI computing system 200 may utilize multi-objective optimization 204 techniques to improve simulation and modeling outcomes. Many real-world problems involve multiple, often conflicting, objectives. Multi-objective optimization techniques, such as evolutionary algorithms (e.g., NSGA-II, MOEA/D), are used to find a set of Pareto-optimal solutions that represent the best trade-offs among the objectives. In the simulation and decision platform 100, multi-objective optimization 204 may be used for generating diverse and high-quality scenarios. The AI component uses multi-objective optimization to create a diverse set of scenarios that cover different regions of the solution space and optimize multiple criteria, such as realism, informativeness, and diversity. As an example, in the grocery store simulation, the AI component generates scenarios that span different combinations of customer arrival rates, checkout times, and restocking times. The optimization objectives could include maximizing the diversity of scenarios, minimizing the difference between simulated and real-world data, and maximizing the expected improvement in KPIs. Multi-objective optimization 204 can also be used for balancing competing objectives. The AI component uses multi-objective optimization to find the best trade-offs between competing objectives specified by the user. For example, in the grocery store simulation, the user might want to minimize the average waiting time and the total staff cost simultaneously. The AI component uses multi-objective optimization to find a set of Pareto-optimal solutions that represent the best trade-offs between these two objectives. The user can then select a solution that aligns with their preferences or business constraints.

The AI computing system 200 of the simulation and decision platform 100 combines these techniques to create a powerful and adaptive system for generating and optimizing scenarios. By leveraging NLP, RL, and multi-objective optimization, the AI component can understand user requirements, adapt to changing conditions, and find the best solutions to complex problems.

In some embodiments, to further enhance the capabilities of the AI component, the simulation and decision platform can integrate additional techniques, such as: surrogate modeling using machine learning models (e.g., Gaussian processes, neural networks) to approximate the behavior of the simulation and enable faster optimization and sensitivity analysis; causal inference employing causal discovery algorithms (e.g., PC algorithm, Granger causality) to identify cause-effect relationships between variables and inform scenario generation and decision-making; and transfer learning leveraging knowledge from previous simulations or related domains to improve the efficiency and accuracy of the AI component in new tasks or environment.

Figure 3:
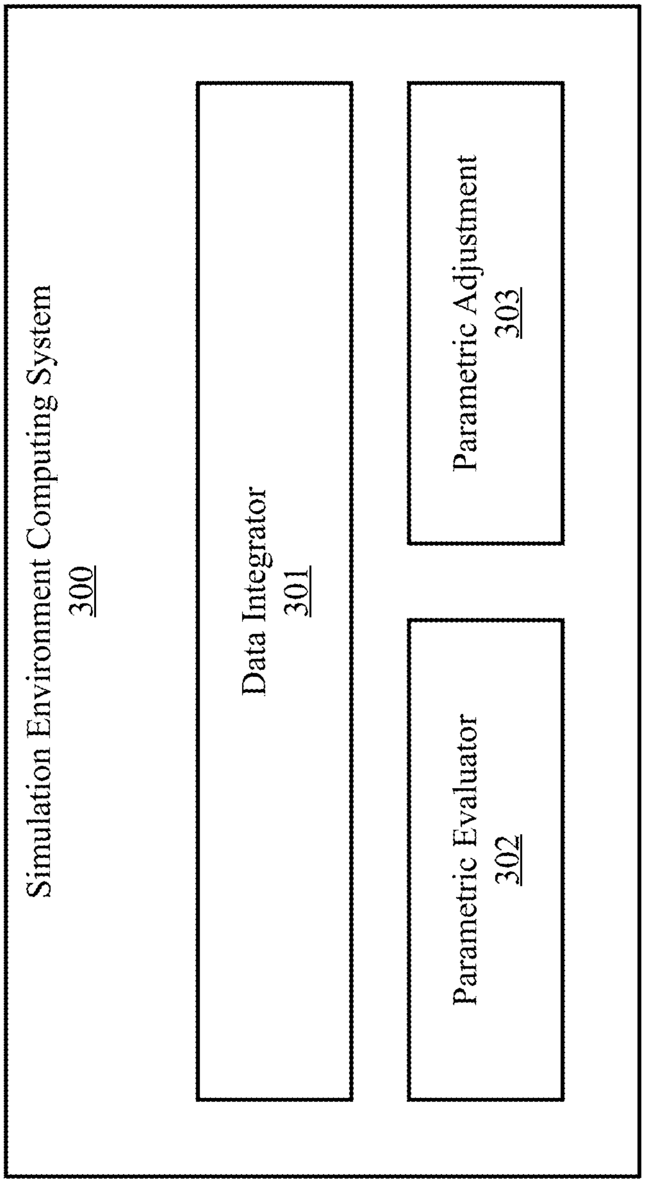
FIG. 3 is a block diagram illustrating an exemplary aspect of a Simulation and Experimental Design Decision Platform, a simulation environment computing system.

FIG. 3 is a block diagram illustrating an exemplary aspect of a Simulation and Experimental Design Decision Platform, a simulation environment computing system. The simulation environment computing system 300 of the simulation and decision platform 100 is responsible for creating a continuous and scalable simulation infrastructure that allows for real-time parameter adjustment and seamless integration with the AI component. This component leverages advanced techniques and technologies from the fields of distributed computing, data processing, and communication protocols. In some embodiments, DCG computing platform 102 may be leveraged to support simulation environment computing tasks.

According to the aspect, simulation environment computing system 300 comprises a data integrator 301, a parametric evaluator 302, and parametric adjustment 303 subsystems.

According to the aspect, simulation environment computing system 300 can be configured to support continuous and scalable simulations, enabling the simulation and decision platform to handle large-scale and long-running simulations efficiently. This may be achieved through the use of distributed computing frameworks and techniques. For example, in the grocery store simulation, the simulation environment component can be implemented using Apache Spark, a distributed computing framework. Spark allows for the parallel execution of simulation tasks across a cluster of machines, enabling the simulation to scale horizontally as the complexity and size of the problem increase. The simulation can be divided into smaller sub-tasks, such as simulating individual store locations or customer segments, which can be processed concurrently on different nodes of the Spark cluster. The continuous and scalable simulation process may comprise the following steps: a. simulation Decomposition: The simulation is decomposed into smaller, independent sub-tasks that can be executed in parallel. This involves identifying the granularity of the simulation (e.g., individual stores, customer segments) and defining the dependencies between sub-tasks. b. Resource Allocation: The simulation environment computing system 300 allocates computing resources, such as CPU cores and memory, to each sub-task based on their computational requirements. This can be done dynamically using Spark's resource manager, which allows for the efficient utilization of cluster resources. c. Parallel Execution: The sub-tasks are distributed across the cluster nodes and executed in parallel. Spark's distributed computing model, based on resilient distributed datasets (RDDs) and DataFrames, enables fault-tolerant and efficient parallel processing of simulation tasks. d. Result Aggregation: The results from the sub-tasks are collected and aggregated to produce the overall simulation output. Spark provides built-in functions for data aggregation, such as reduceByKey and groupByKey, which can be used to combine the results from different nodes. Alternates such as BEAM or Flink may also be used during simulation result processing. Dedicated simulation engines, such as distributed cluster-based discrete event simulators, may also be used.

According to the aspect, simulation environment computing system 300 allows for real-time parameter adjustment, enabling the AI component to adapt the simulation based on the evolving state of the system and user-defined objectives. In some implementations, this may be achieved through the use of streaming data processing frameworks and low-latency communication protocols. As an example, in the grocery store simulation, the simulation environment computing system can use Apache Kafka, a distributed streaming platform, to enable real-time parameter adjustment. Kafka allows for the publishing and subscribing of simulation events and parameter updates in real-time. The AI component can subscribe to the relevant topics and receive updates on the simulation state, such as customer waiting times, staff utilization, and inventory levels. Based on these updates, the AI component can make decisions and publish parameter adjustments, such as changing the number of cashiers or restocking frequency, back to the simulation environment. The real-time parameter adjustment process may comprise the following steps: a. Event Publishing: The simulation environment component publishes simulation events and state updates to designated Kafka topics. These events can include customer arrivals, checkout times, inventory levels, and other relevant metrics. b. Event Subscription: The AI component subscribes to the relevant Kafka topics and receives the simulation events in real-time. This allows the AI component to maintain an up-to-date view of the simulation state. c. Decision Making: The AI component processes the received events and makes decisions based on the defined objectives and constraints. This can involve applying reinforcement learning, multi-objective optimization, or other AI techniques to determine the optimal parameter adjustments. d. Parameter Publishing: The AI component publishes the parameter adjustments back to the simulation environment through Kafka topics. These adjustments can include changes to the number of staff, restocking schedules, or other controllable variables. e. Parameter Application: The simulation environment computing system receives the parameter adjustments and applies them to the ongoing simulation. This allows for real-time adaptation of the simulation based on the AI component's decisions.

The simulation environment computing system can leverage vector databases to efficiently store and retrieve system states. Each state can be represented as a high-dimensional vector embedding that captures the relevant features and metrics of the simulation at a given point in time. These state vectors can be stored in a vector database, enabling fast similarity search and retrieval of states based on their vector representations. This allows the AI component to quickly identify similar states encountered in the past and make informed decisions based on historical patterns and outcomes. Furthermore, the simulation environment computing system can utilize knowledge graphs to model the relationships and transitions between different system states. The knowledge graph can represent states as nodes and the transitions between states as edges. Each edge can be labeled with the corresponding actions, events, or parameter changes that triggered the transition. By traversing the knowledge graph, the AI component can analyze the sequences of actions and their impact on the system state, enabling it to learn optimal strategies and policies for achieving the desired objectives. The knowledge graph can also capture causal relationships and dependencies between different aspects of the simulation, providing a structured representation of the system dynamics. By combining vector databases for efficient state storage and retrieval with knowledge graphs for modeling state transitions and relationships, the simulation environment computing system can enable powerful real-time parameter adjustment capabilities. The AI component can leverage these data structures to make informed decisions, adapt to evolving conditions, and optimize the simulation based on user-defined objectives and constraints.

According to the aspect, simulation environment computing system 300 is configured to seamlessly integrate with the AI component, enabling a closed-loop feedback system where the AI component can learn from the simulation results and adapt its strategies accordingly. This integration is facilitated through the use of data exchange formats and communication protocols leveraged by data integrator 301. For example, in the grocery store simulation, the simulation environment component can use Apache Avro, a data serialization framework, to define a common data schema for exchanging simulation data with the AI component. Avro allows for the efficient serialization and deserialization of structured data, ensuring compatibility and ease of integration between the simulation environment and the AI component. The integration between the simulation environment and the AI component may comprise the following steps: a. Data Schema Definition: The simulation environment component defines a common data schema using Avro for the simulation data that needs to be exchanged with the AI component. This schema specifies the structure and format of the data, including the types of variables, their names, and any nested structures. If a user tries to select a model or dataset which does not comply with the schema, the simulation and decision platform can alert the user about the lack of compliance and suggest more suitable models/datasets. b. Data Serialization: The simulation environment component serializes the simulation data using the defined Avro schema. This involves converting the data from its native format (e.g., objects, dataframes) into a compact binary representation that can be efficiently transmitted over the network. c. Data Exchange: The serialized simulation data is exchanged between the simulation environment and the AI component using a communication protocol, such as Apache Kafka or REST Application Programming Interfaces (APIs). The AI component can consume the simulation data, process it using its algorithms and models, and generate insights or parameter adjustments. d. Data Deserialization: The AI component deserializes the received simulation data using the same Avro schema, converting it back into a usable format for further processing. This ensures that the data is correctly interpreted and can be seamlessly integrated into the AI component's workflows. e. Feedback Loop: The AI component processes the simulation data, generates insights or parameter adjustments, and sends them back to the simulation environment component. The simulation environment component receives these updates, deserializes them using the agreed-upon schema, and applies them to the ongoing simulation, completing the feedback loop.

It should be appreciated that the specific technologies and frameworks mentioned (e.g., Apache Spark, Kafka, Avro) are just examples, and simulation and decision platform 100 can be implemented using different tools and platforms based on the specific requirements and constraints of the project. The key principles of distributed computing, real-time processing, and data exchange remain applicable regardless of the chosen technologies. Furthermore, the simulation environment computing system 300 should be designed with scalability, fault-tolerance, and performance in mind. This involves considerations such as data partitioning, load balancing, and resource management to ensure that the simulations can handle increasing complexity and data volumes without compromising the overall system performance.

Figure 4:
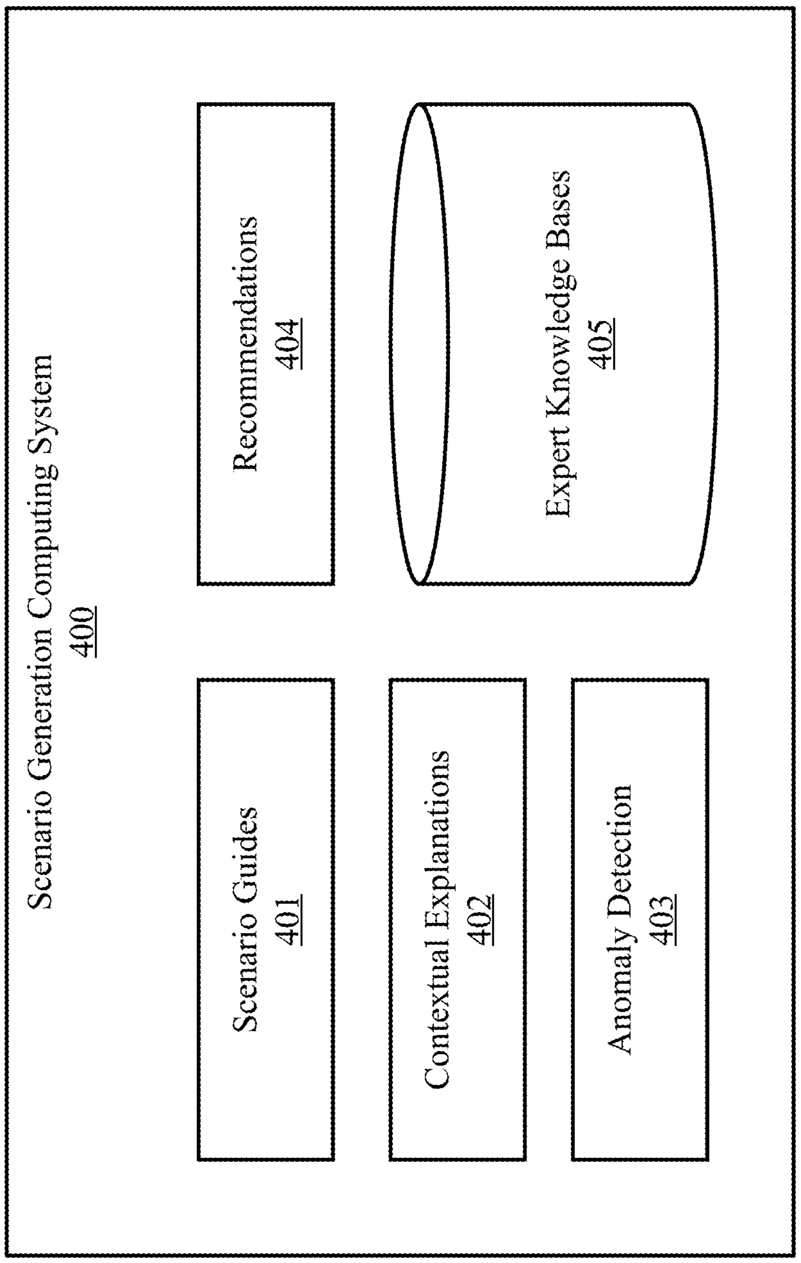
FIG. 4 is a block diagram illustrating an exemplary aspect of a Simulation and Experimental Design Decision Platform, a scenario generation computing system.

FIG. 4 is a block diagram illustrating an exemplary aspect of a Simulation and Experimental Design Decision Platform, a scenario generation computing system. According to the aspect, the scenario generation and guidance computing system 400 of the simulation and decision platform 100 is configured for creating realistic and diverse scenarios, providing human-readable scenario descriptions, and offering contextual explanations, recommendations, and warnings to support decision-making. This component leverages advanced techniques from the fields of explainable AI (XAI), natural language processing (NLP), and anomaly detection as well as traditional AI-enhanced planning domains (e.g., policy learning and formulation for games like AlphaGo).

According to the aspect, scenario generation computing system 400 comprises a scenario guide generation 401, contextual explanations 402, anomaly detection 403, and recommendation 404 components, as well as one or more expert knowledge databases 405.

According to the aspect, the scenario generation subsystem 401 may utilize explainable AI techniques to generate human-readable scenarios that capture the key aspects of the system being modeled. These scenarios provide a clear and concise description of the initial conditions, assumptions, and expected outcomes, making them easily understandable by domain experts and stakeholders. As an example, in the grocery store simulation, the scenario generation component can use a combination of rule-based and machine learning techniques to generate human-readable scenarios. For instance, it can utilize decision trees or association rule mining to identify common patterns and relationships in the historical data, such as peak shopping hours, popular product categories, and typical customer behavior. Based on these patterns, the component can generate scenarios that describe different operating conditions, such as: "Scenario 1: Weekend Rush"; "Day: Saturday"; Time: 10:00 AM-12:00 PM"; "Customer Arrival Rate: High (50 customers per hour)"; "Popular Product Categories: Fresh Produce, Bakery, Snacks"; "Staff Allocation: 8 cashiers, 4 stockers"; and "Expected Waiting Time: 5-10 minutes."

In some implementations, the scenario generation process may comprise the following steps: a. Data Analysis: The historical data is analyzed using machine learning techniques, such as clustering, association rule mining, or decision trees, to identify patterns, relationships, and key influencing factors. b. Scenario Template Definition: A scenario template is defined, specifying the structure and format of the human-readable scenarios. This template includes placeholders for relevant variables, such as day, time, customer arrival rate, popular product categories, and staff allocation. c. Scenario Instantiation: The identified patterns and relationships are used to instantiate the scenario template, filling in the placeholders with specific values based on the historical data and domain knowledge. d. Natural Language Generation: The instantiated scenarios are transformed into human-readable descriptions using natural language generation techniques, such as template-based or rule-based approaches. This involves mapping the structured scenario data to natural language sentences and paragraphs.

According to the aspect, the scenario generation computing system 400 provides contextual explanations and warnings 402 to help users understand the implications of the generated scenarios and make informed decisions. These explanations highlight the key factors influencing the scenario outcomes and provide insights into potential risks or opportunities. For example, in the grocery store simulation, the scenario generation system can provide contextual explanations and warnings based on the generated scenarios. For instance, if a scenario indicates a high customer arrival rate during peak hours, the component can generate an explanation such as: "Explanation: The high customer arrival rate during peak hours may lead to longer waiting times and increased staff workload. Consider allocating additional cashiers and stockers to handle the increased demand and ensure customer satisfaction." Similarly, if a scenario suggests a potential stock-out situation for a popular product category, the component can generate a warning such as: "Warning: The increased demand for fresh produce during the weekend rush may result in a stock-out situation. Consider increasing the inventory levels and frequency of restocking for fresh produce to avoid lost sales and customer dissatisfaction."

In some implementations, the contextual explanation and warning generation process may comprise the following steps: a. Scenario Analysis: The generated scenarios are analyzed to identify key factors, trends, and potential issues that may impact the system's performance or outcomes. b. Knowledge Base Integration: The scenario generation component integrates with a knowledge base 405 that contains domain-specific information, best practices, and expert insights. This knowledge base is used to provide context and guidance based on the identified factors and trends. c. Explanation Generation: Based on the scenario analysis and knowledge base integration, the component generates explanations that highlight the key influences, potential consequences, and recommended actions 404. These explanations are generated using natural language generation techniques, such as template-based or rule-based approaches. d. Warning Generation: If the scenario analysis reveals potential risks or issues, the component generates warnings to alert users and provide proactive guidance. These warnings may be generated based on predefined risk thresholds, domain-specific rules, or machine learning models trained on historical data.

According to the aspect, the scenario generation computing system 400 may incorporate anomaly detection 403 techniques to identify unusual or unexpected scenarios that may require further investigation or validation. This helps in detecting potential data quality issues, outliers, or rare events that could impact the simulation results. As an example, in the grocery store simulation, the scenario generation component can use unsupervised learning techniques, such as clustering or autoencoders, to detect anomalous scenarios. For instance, if a generated scenario suggests an extremely high customer arrival rate that deviates significantly from the historical patterns, the component can flag it as an anomaly and provide a notification to the user:

"Anomaly Detected: The generated scenario suggests a customer arrival rate of 100 customers per hour, which is significantly higher than the typical range of 20-50 customers per hour. Please review and validate the scenario inputs to ensure accuracy and feasibility."

In some implementations, the anomaly detection and scenario validation process may comprise the following steps: a. Anomaly Detection Model Training: An anomaly detection model, such as an autoencoder or isolation forest, is trained on the historical data to learn the normal patterns and behaviors of the system. b. Scenario Scoring: Each generated scenario is scored using the trained anomaly detection model to assess its deviation from the normal patterns. Scenarios that receive high anomaly scores are flagged as potential anomalies. c. User Notification: If an anomaly is detected, the scenario generation computing system 400 notifies the user (via the simulation and decision platform), providing details about the anomalous scenario and requesting further validation or investigation. d. Scenario Validation: The user can review the flagged scenarios and provide feedback on their validity or feasibility. This feedback can be used to refine the anomaly detection model and improve the scenario generation process over time.

It should be appreciated that the specific techniques and algorithms mentioned (e.g., decision trees, association rule mining, autoencoders) are just examples, and the actual implementation may vary based on the specific requirements and characteristics of the system being modeled. The choice of techniques may be based on factors such as the available data, computational resources, and desired level of explainability. Furthermore, the scenario generation and guidance computing system 400 may be configured to incorporate user feedback and domain expertise to continuously improve the quality and relevance of the generated scenarios. This can involve active learning techniques, where the component learns from user interactions and adapts its scenario generation process accordingly.

Overall, the scenario generation and guidance computing system 400 of the simulation and decision platform 100 enhances the usability and interpretability of the simulation results, enabling users to make informed decisions based on realistic and contextualized scenarios. By providing human-readable descriptions, explanations, warnings, and anomaly detection, this system contributes to the overall goal of reducing epistemic uncertainty and supporting decision-making in complex systems.

Figure 5:
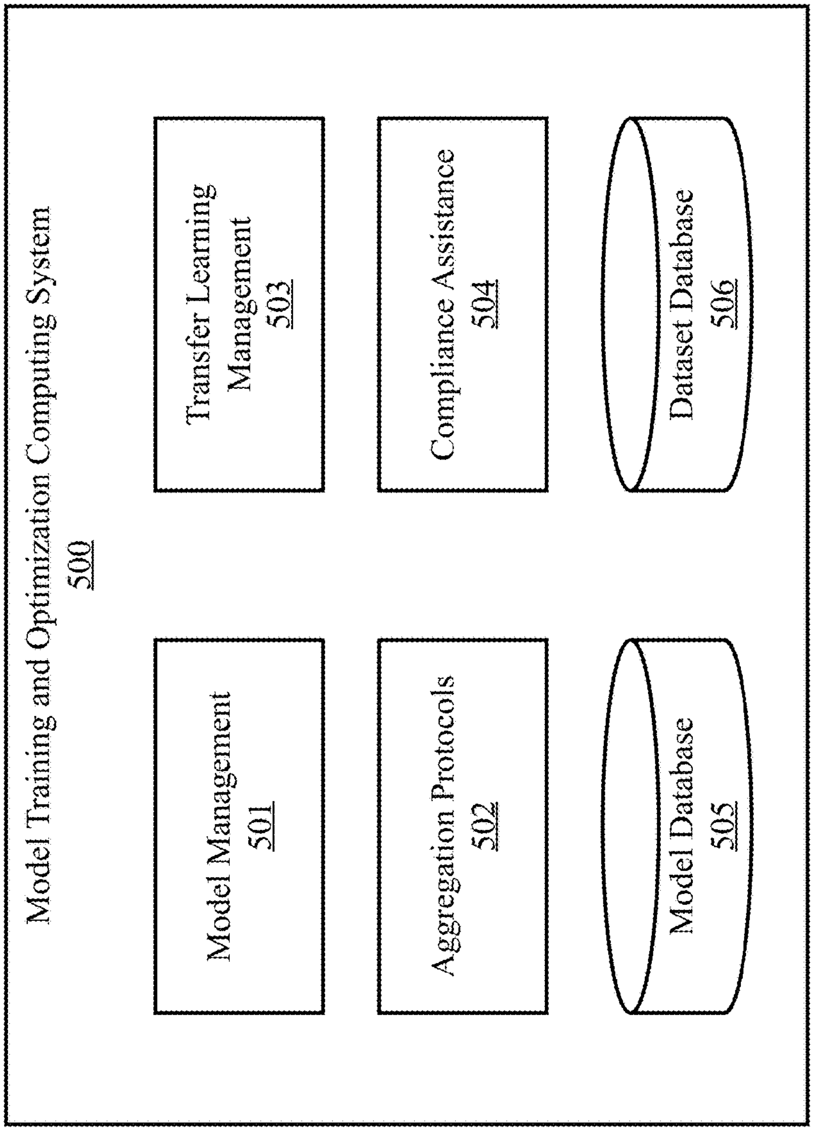
FIG. 5 is a block diagram illustrating an exemplary aspect of a Simulation and Experimental Design Decision Platform, a model training and optimization computing system.

FIG. 5 is a block diagram illustrating an exemplary aspect of a Simulation and Experimental Design Decision Platform, a model training and optimization computing system. According to the aspect, the model training and optimization computing system 500 of the simulation and decision platform 100 may be configured for efficiently training and optimizing the machine learning models used in the simulation, while ensuring compliance with relevant regulations and guidelines. The training and optimization system may leverage advanced techniques from the fields of federated learning, transfer learning, and privacy-preserving machine learning.

According to the aspect, model training and optimization computing system 500 comprises multiple subsystems which support and decision platform functionality including model management 501, aggregation protocols 502, transfer learning management 503, and compliance assistance 504 subsystems. Model training/optimization system 500 may further comprise a plurality of databases for storing a plurality of models/algorithms (as well as their performance and versioning history) 505 which may be used to support platform 100 goals (e.g., simulation, inference, classification, NLP, generation, recommendation, etc.) and for storing a plurality of datasets 506 or knowledge bases for use for training and validating models as well as to construct simulation scenarios. Dataset databases 506 may comprise one or more vector databases for storing data embeddings to be used as model inputs for training and inference purposes.

According to some aspects, model training and optimization computing system 500 provides federated learning techniques via model management subsystem 501. Federated learning is a distributed machine learning approach that enables training models on decentralized data without the need for data sharing. This is particularly useful when dealing with sensitive or confidential data, as it allows for collaborative model training while preserving data privacy. As an example, in the context of the grocery store simulation, suppose there are multiple grocery store chains participating in the simulation, each with their own customer data. Federated learning can be used to train a global model for predicting customer behavior without requiring the individual stores to share their data directly.

In some implementations, the federated learning process may comprise the following steps: a. Local Model Training: Each participating store trains a local model using its own customer data. The local models are trained on the same model architecture and hyperparameters as the global model. b. Gradient Aggregation: Instead of sharing the raw data, each store computes the gradients (i.e., the direction and magnitude of model updates) based on its local training. These gradients are then securely transmitted to a central server (i.e., simulation and decision platform 100). c. Secure Aggregation: The central server receives the gradients from all participating stores and performs secure aggregation using techniques like secure multi-party computation or homomorphic encryption. This ensures that the individual gradients are not exposed and only the aggregated update is computed. d. Global Model Update: The aggregated gradients are used to update the global model parameters. The updated global model is then distributed back to the participating stores. e. Iteration: Steps a-d are repeated for multiple rounds until the global model converges or a desired level of performance is achieved. Federated learning helps in training accurate models while maintaining data privacy and security. It enables the simulation and decision platform 100 to leverage data from multiple sources without the need for direct data sharing.

The model training and optimization computing system can utilize aggregation protocols 502, particularly in the context of federated learning, to securely combine the locally trained models or gradients from multiple participating entities without revealing their individual contributions. Aggregation protocols ensure that the global model is updated based on the collective knowledge of the participants while preserving data privacy and security. Secure aggregation protocols allow multiple parties to compute the sum or average of their individual values without disclosing those values to each other. In the context of federated learning, secure aggregation is used to combine the local model updates or gradients from the participating entities. As an example, in the grocery store simulation, multiple stores participate in federated learning to train a global model for customer behavior prediction. Each store computes the gradients based on their local data and sends them to a central server for aggregation. Secure aggregation protocols ensure that the individual gradients are not exposed, and only the aggregated result is computed.

In some scenarios, there may be concerns about malicious participants who attempt to manipulate the aggregation process or contribute false data. Secure aggregation protocols can be extended to handle such cases and ensure the integrity of the aggregated result. For example, in the grocery store simulation, a malicious participant may attempt to manipulate the aggregation process by contributing false gradients or attempting to infer the contributions of other participants. Secure aggregation protocols with malicious participant handling can detect and mitigate such attempts. Techniques for handling malicious participants in secure aggregation which may be implemented can include: a. Participant Authentication: Each participating store is authenticated using cryptographic techniques (e.g., digital signatures) to ensure that only authorized parties can contribute to the aggregation process. b. Commitment Schemes: Participants commit to their local gradients before the aggregation process begins. The commitments are cryptographically binding and prevent participants from modifying their contributions after seeing the contributions of others. c. Zero-Knowledge Proofs: Participants can provide zero-knowledge proofs to demonstrate that their contributions are valid and follow the expected format or range. This helps in detecting and excluding malicious contributions. d. Robust Aggregation: Aggregation algorithms that are resilient to a certain number of malicious participants can be employed. These algorithms can detect and remove outliers or inconsistent contributions to maintain the integrity of the aggregated result. By incorporating techniques for handling malicious participants, the model training and optimization computing system 500 can ensure the robustness and reliability of the aggregation process, even in the presence of adversarial actors.

It should be appreciated that the specific implementation of aggregation protocols may vary depending on the chosen cryptographic techniques, the level of privacy and security required, and the computational resources available. The choice of protocols may be based on a careful analysis of the system requirements, potential threats, and the trade-offs between privacy, performance, and complexity. Furthermore, the use of aggregation protocols may be complemented by other security measures, such as secure communication channels, access control mechanisms, and regular security audits, to ensure a comprehensive security framework for the model training and optimization system of the platform.

According to some aspects, model training and optimization computing system 500 provides transfer learning management 503. Transfer learning is a technique that allows leveraging knowledge gained from one task or domain to improve the performance or efficiency of learning in another related task or domain. It involves transferring the learned features or model parameters from a source task to a target task. For example, in the grocery store simulation, consider a pre-trained model for customer segmentation based on purchase history from a related retail domain. Transfer learning can be used to adapt this model to the specific context of the grocery store simulation. In some implementations, the transfer learning process may comprise the following steps: a. Source Model Selection: A pre-trained model that is relevant to the target task is selected. In this case, a customer segmentation model trained on a related retail dataset. b. Model Adaptation: The pre-trained model is fine-tuned or adapted to the specific characteristics of the grocery store simulation. This may involve modifying the model architecture, updating the output layer, or adjusting the hyperparameters. c. Target Data Preparation: A smaller dataset from the grocery store domain is prepared to be used for fine-tuning the pre-trained model. This dataset should be representative of the target task and may include labeled examples of customer segments specific to the grocery store. d. Fine-tuning: The pre-trained model is fine-tuned using the prepared target dataset. The model is trained for a few iterations or epochs, allowing it to adapt its learned features to the grocery store domain. e. Model Evaluation: The fine-tuned model is evaluated on a separate test set from the grocery store domain to assess its performance and generalization ability. Transfer learning allows the simulation and decision platform 100 to leverage existing knowledge and reduce the time and data requirements for training new models. It is particularly useful when the available data for the target task is limited or when there are similarities between the source and target domains.

According to the embodiment, model training and optimization computing system 500 can provide compliance assistance 504 (e.g., data sharing, model sharing, regulatory and legal constraints, etc.). Privacy-preserving machine learning techniques aim to protect sensitive information during the model training and inference processes. These techniques ensure that the model does not leak or expose private data while still allowing for effective learning and prediction. For example, in the grocery store simulation, customer data may contain sensitive information such as personal identifiers, purchase history, or demographic details. Privacy-preserving techniques can be applied to ensure that this sensitive information is not compromised during the model training and optimization process.

Some common privacy-preserving techniques which may be implemented to ensure compliance include: a. Differential Privacy: Differential privacy involves adding controlled noise to the data or the model parameters to mask the contribution of individual records. This ensures that the presence or absence of a single record does not significantly affect the model's output, thus protecting individual privacy. b. Homomorphic Encryption: Homomorphic encryption allows computations to be performed on encrypted data without decrypting it. This enables model training and inference to be performed on encrypted data, ensuring that the sensitive information remains protected. c. Secure Multi-Party Computation: Secure multi-party computation protocols enable multiple parties to jointly compute a function over their private inputs without revealing those inputs to each other. This allows for collaborative model training and inference while preserving data privacy. d. Federated Learning with Differential Privacy: Federated learning can be combined with differential privacy techniques to provide an additional layer of privacy protection. Noise can be added to the local gradients before aggregation, ensuring that individual contributions are masked. Privacy-preserving techniques help in building trust and ensuring compliance with data protection regulations, such as the European Union's General Data Protection Regulation (GDPR) or the United States' Health Insurance Portability and Accountability Act (HIPAA). The simulation and decision platform can incorporate these techniques to safeguard sensitive information while still leveraging the power of machine learning for optimization and decision-making.

According to the aspect, model management 501 subsystem can provide techniques and mechanisms for optimizing the models used by platform 100. Model optimization involves finding the best set of hyperparameters and model configurations that maximize the performance of the machine learning models used in the simulation. This process aims to improve the accuracy, efficiency, and generalization ability of the models. As an example, in the grocery store simulation, the model training and optimization computing system 500 can use techniques like grid search or Bayesian optimization to find the optimal hyperparameters for the customer behavior prediction model. The model optimization process may comprise the following steps: a. Hyperparameter Definition: The hyperparameters to be optimized are defined, such as learning rate, batch size, regularization strength, or network architecture. b. Optimization Algorithm Selection: An optimization algorithm is selected, such as grid search, random search, or Bayesian optimization. These algorithms systematically explore the hyperparameter space to find the best combination of values. c. Evaluation Metric Definition: An evaluation metric is defined to assess the performance of the model, such as accuracy, F1 score, or mean squared error. This metric serves as the objective function to be optimized. d. Hyperparameter Search: The selected optimization algorithm is used to search through the hyperparameter space. Each combination of hyperparameters is used to train and evaluate the model using the defined evaluation metric. e. Best Model Selection: The hyperparameter combination that yields the best performance according to the evaluation metric is selected as the optimal configuration. f. Model Retraining: The model is retrained using the optimal hyperparameters on the full training dataset to obtain the final optimized model. Model optimization helps in improving the performance and efficiency of the machine learning models used in the simulation and decision platform. It ensures that the models are well-tuned and can provide accurate predictions and insights for decision-making.

According to some aspects, the model training and optimization computing system 500 may be designed to support continuous learning and adaptation as new data becomes available or the simulation environment evolves. This involves regularly updating the models to capture the latest patterns, trends, and changes in the system being modeled. For example, in the grocery store simulation, customer behavior and preferences may change over time due to factors such as seasonal trends, promotions, or external events. The model training and optimization component should be able to continuously update the models to adapt to these changes. Continuous learning and adaptation can be achieved through the following techniques: a. Online Learning: Models are updated incrementally as new data becomes available, without requiring a full retraining from scratch. Online learning algorithms, such as stochastic gradient descent or incremental learning, can be used to update the model parameters based on the incoming data. b. Concept Drift Detection: Techniques like concept drift detection are used to identify when the underlying data distribution or patterns have significantly changed. This triggers the need for model retraining or adaptation to capture the new concepts. c. Model Versioning and Management: A robust model versioning and management system is implemented to keep track of different versions of the models, their performance, and the associated data. This allows for easy rollback, comparison, and reproduction of previous model states. d. Automated Retraining Pipelines: Automated retraining pipelines are set up (e.g., via DCG computing system 102) to regularly retrain the models using the latest available data. These pipelines can be triggered based on predefined schedules, data volume thresholds, or performance degradation indicators. Continuous learning and adaptation ensure that the simulation and decision platform remains up-to-date and responsive to the evolving dynamics of the system being modeled. It helps in maintaining the accuracy and relevance of the predictions and recommendations provided by the system.

It should be appreciated that the specific techniques and algorithms mentioned (e.g., federated learning, differential privacy, Bayesian optimization) are examples and the actual implementation may vary based on the specific requirements, constraints, and characteristics of the system being modeled. The choice of techniques may be based on factors such as data privacy concerns, available computational resources, and the desired level of model performance and interpretability.

Detailed Description of Exemplary Aspects

Figure 6:
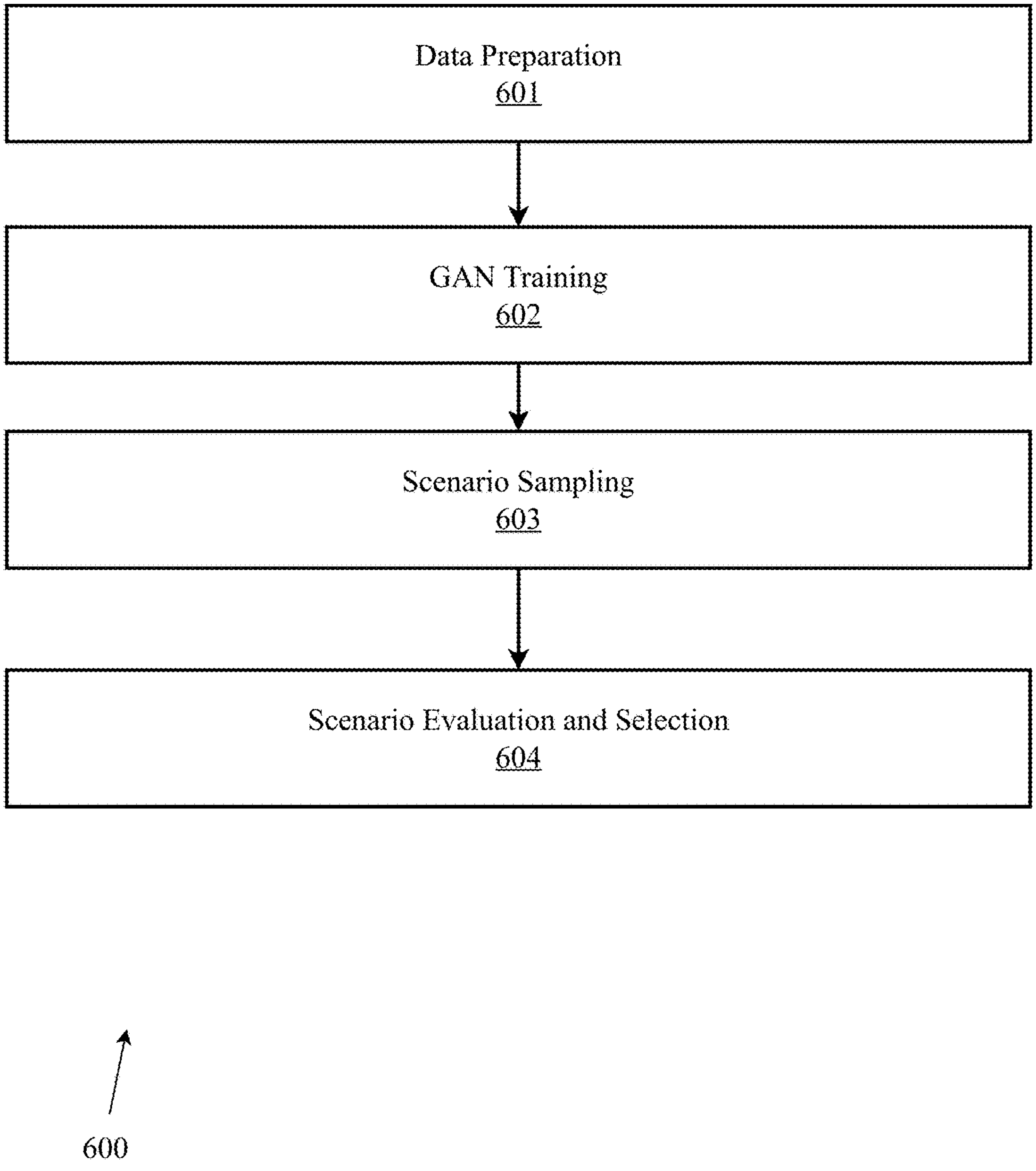
FIG. 6 is a flow diagram illustrating an exemplary method for scenario generation using a generative adversarial network, according to an embodiment.

FIG. 6 is a flow diagram illustrating an exemplary method 600 for scenario generation using a generative adversarial network, according to an embodiment. According to the embodiment, the scenario generation process using GANs begins at step 601 by preparing the data. Platform 100 can collect and preprocess historical data related to the system being modeled, such as customer arrival rates, checkout times, and restocking times in the grocery store example. At step 602 platform 100 performs GAN training. Train a GAN on the preprocessed data. The GAN consists of two neural networks: a generator and a discriminator. The generator learns to create new scenarios that resemble the real data, while the discriminator learns to distinguish between real and generated scenarios. The two networks may be trained simultaneously in an adversarial manner until the generator can create scenarios that are indistinguishable from the real data. Scenario sampling is performed at step 603. Once the GAN is trained, new scenarios can be generated by sampling from the generator network. The generated scenarios will capture the patterns and characteristics learned from the historical data. Scenario evaluation and selection is performed at a next step 604. The generated scenarios can be evaluated based on various criteria, such as realism, diversity, and relevance to the simulation objectives. The most promising scenarios can be selected for further analysis or integration into the simulation.

Figure 7:
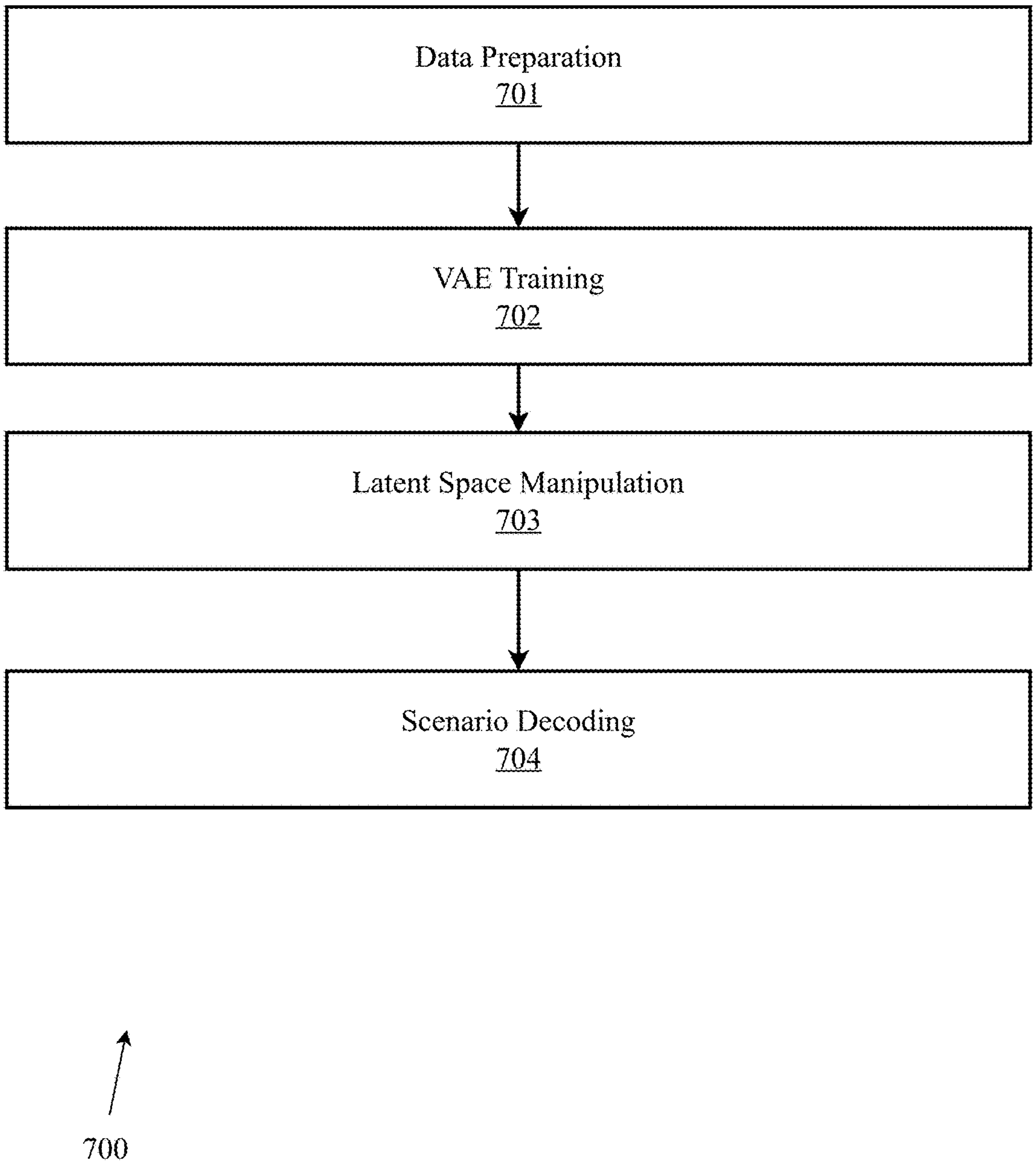
FIG. 7 is a flow diagram illustrating an exemplary method for counterfactual scenario generation using a variational autoencoder, according to an embodiment.

FIG. 7 is a flow diagram illustrating an exemplary method 700 for counterfactual scenario generation using a variational autoencoder, according to an embodiment. The counterfactual scenario generation process using VAEs begins at step 701 with data preparation. Platform 100 can collect and preprocess historical data related to the system being modeled. VAE training is performed at step 702. Platform 100 can train a VAE on the preprocessed data. The VAE consists of an encoder network that maps the input data to a lower-dimensional latent space and a decoder network that reconstructs the original data from the latent representation. The VAE is trained to minimize the reconstruction loss and regularize the latent space to follow a prior distribution (e.g., a standard Gaussian distribution). At a next step 703, latent space manipulation is performed. Once the VAE is trained, counterfactual scenarios can be generated by manipulating the latent variables. This can be done by specifying desired changes in the latent space (e.g., increasing or decreasing certain latent variables) or by optimizing the latent variables to satisfy specific constraints or objectives. Scenario decoding is performed at step 704. The manipulated latent variables are passed through the decoder network to generate counterfactual scenarios. The decoder network maps the modified latent representation back to the original data space, creating scenarios that incorporate the desired changes.

The integration of generative models in the AI component enables the simulation and decision platform to create a wide range of realistic and diverse scenarios, explore counterfactual situations, and adapt to user feedback and real-time data. By leveraging the power of GANs, VAEs, and other generative techniques, the AI component can enhance the effectiveness and flexibility of the simulation, ultimately leading to better decision-making and reduced epistemic uncertainty.

Figure 8:
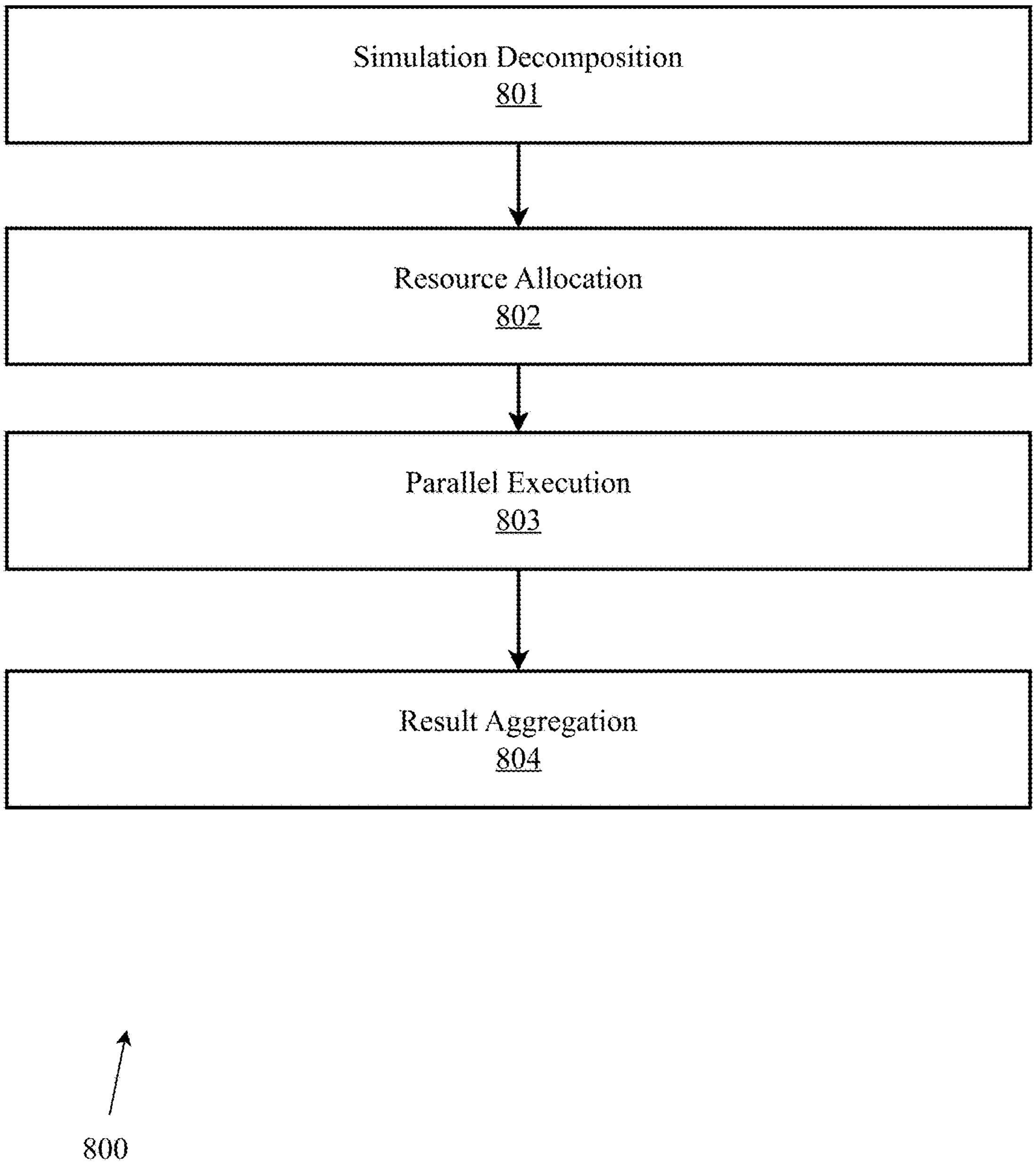
FIG. 8 is a flow diagram illustrating an exemplary method for providing continuous and scalable simulation, according to an embodiment.

FIG. 8 is a flow diagram illustrating an exemplary method 800 for providing continuous and scalable simulation, according to an embodiment. According to the embodiment, the continuous and scalable simulation process begins at step 801 with simulation decomposition. The simulation is decomposed into smaller, independent sub-tasks that can be executed in parallel. This involves identifying the granularity of the simulation (e.g., individual stores, customer segments) and defining the dependencies between sub-tasks. Resource allocation is performed at step 802. The simulation environment computing system 300 allocates computing resources, such as CPU cores and memory, to each sub-task based on their computational requirements. This can be done dynamically using, for example, Spark's resource manager, which allows for the efficient utilization of cluster resources. At step 803 platform 100 implements parallel execution. The sub-tasks are distributed across the cluster nodes and executed in parallel. Using Spark's distributed computing model, based on resilient distributed datasets (RDDs) and dataframes, enables fault-tolerant and efficient parallel processing of simulation tasks. Result aggregation is performed at step 804. The results from the sub-tasks are collected and aggregated to produce the overall simulation output. Spark provides built-in functions for data aggregation, such as reduceByKey and groupByKey, which can be used to combine the results from different nodes.

Figure 9:
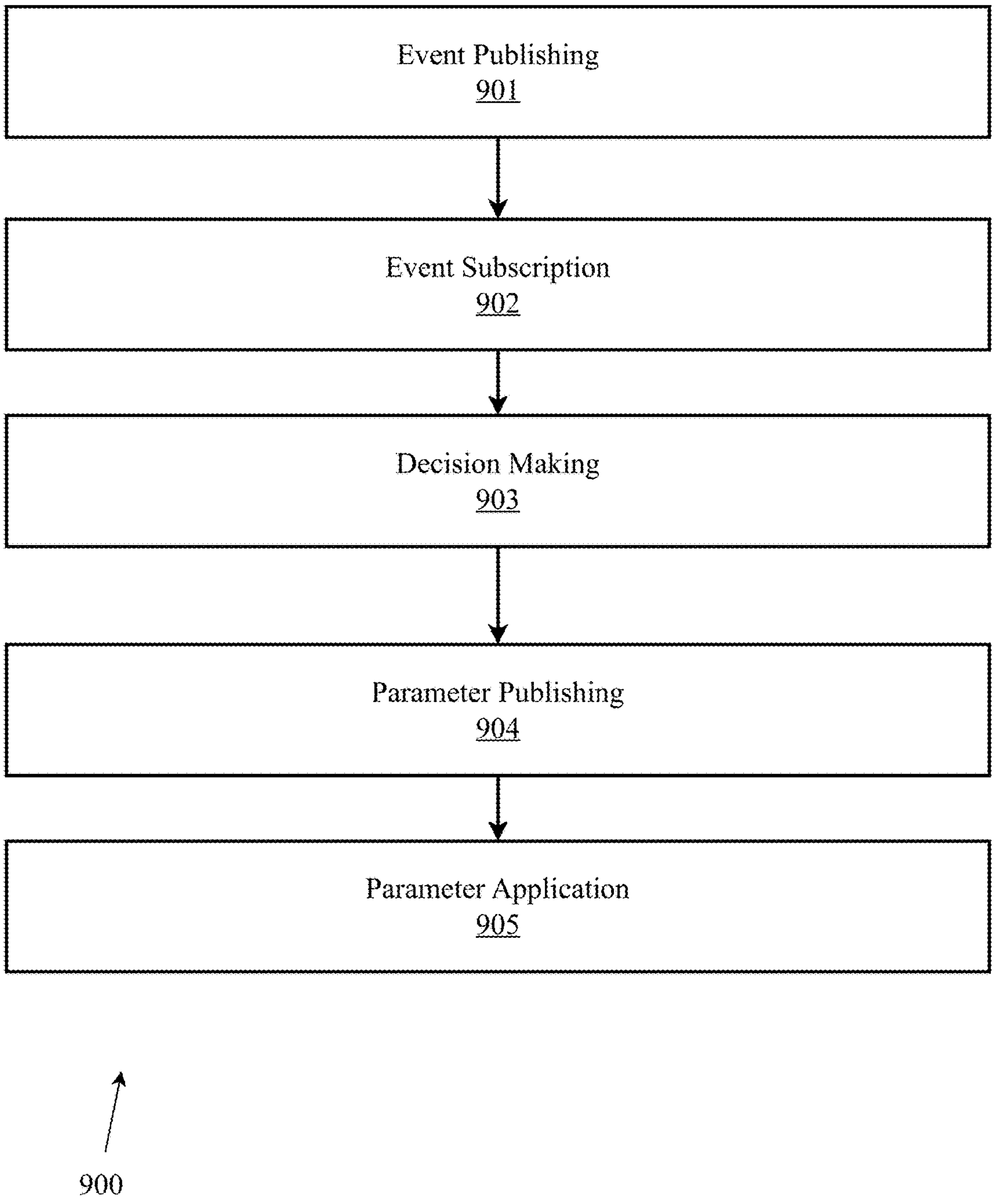
FIG. 9 is a flow diagram illustrating an exemplary method for providing real-time parameter adjustment for simulation parameters, according to an embodiment.

FIG. 9 is a flow diagram illustrating an exemplary method 900 for providing real-time parameter adjustment for simulation parameters, according to an embodiment. According to the embodiment, the real-time parameter adjustment process begins at step 901 with event publishing. The simulation environment computing system 300 publishes simulation events and state updates to designated Kafka topics. These events can include customer arrivals, checkout times, inventory levels, and other relevant metrics. At step 902 platform performs event subscription. The AI component subscribes to the relevant Kafka topics and receives the simulation events in real-time. This allows the AI component to maintain an up-to-date view of the simulation state. Decision making (e.g., recommendation of action or plan to user or taking fully automated action) is performed at step 903. The AI component processes the received events and makes decisions based on the defined objectives and constraints. This can involve applying reinforcement learning, multi-objective optimization, or other AI techniques to determine the optimal parameter adjustments. At step 904, platform performs parameter publishing. The AI component publishes the parameter adjustments back to the simulation environment through Kafka topics. These adjustments can include changes to the number of staff, restocking schedules, or other controllable variables. As a last step 905 platform applies the parameters. The simulation environment component receives the parameter adjustments and applies them to the ongoing simulation. This allows for real-time adaptation of the simulation based on the AI component's decisions.

Figure 10:
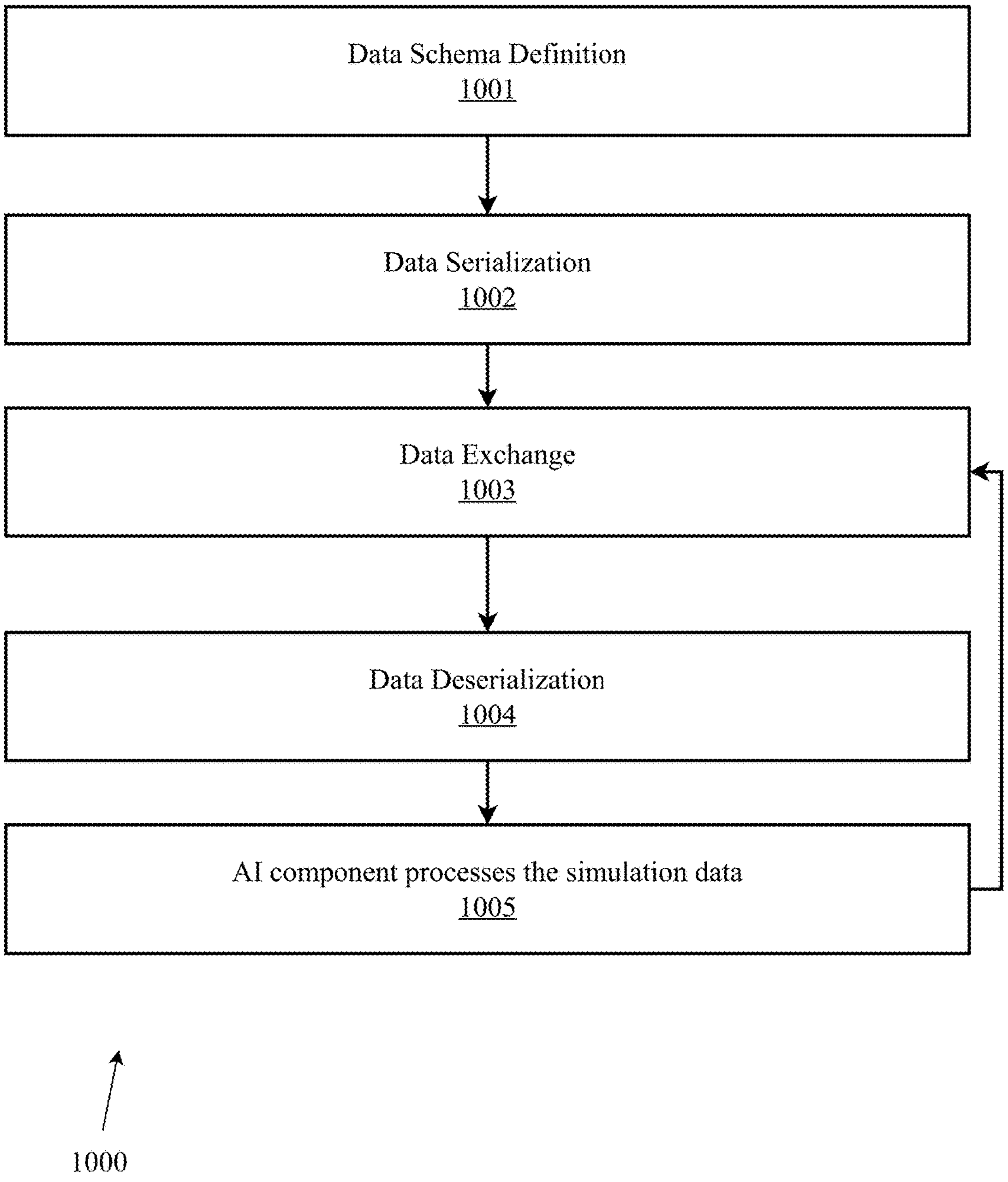
FIG. 10 is a flow diagram illustrating an exemplary method for integrating simulation environment subsystems and processes with an AI system, according to an embodiment.

FIG. 10 is a flow diagram illustrating an exemplary method 1000 for integrating simulation environment subsystems and processes with an AI system, according to an embodiment. According to the embodiment, the integration between the simulation environment and the AI component begins at step 1001 with a data schema definition. The simulation environment computing system 300 defines a common data schema using, for example, Avro for the simulation data that needs to be exchanged with the AI component. This schema specifies the structure and format of the data, including the types of variables, their names, and any nested structures. At step 1002, data serialization is performed. The simulation environment computing system 300 serializes the simulation data using the defined schema. This involves converting the data from its native format (e.g., objects, DataFrames) into a compact binary representation that can be efficiently transmitted over the network. Data is exchanged at step 1003. The serialized simulation data is exchanged between the simulation environment and the AI component using a communication protocol, such as Apache Kafka or REST APIs. The AI component can consume the simulation data, process it using its algorithms and models, and generate insights or parameter adjustments. At step 1004 data deserialization is performed. The AI component deserializes the received simulation data using the same schema (e.g., Avro), converting it back into a usable format for further processing. This ensures that the data is correctly interpreted and can be seamlessly integrated into the AI component's workflows. At step 1005 the AI component processes the simulation data, generates insights or parameter adjustments, and sends them back to simulation environment computing system. The simulation environment system receives these updates, deserializes them using the agreed-upon schema, and applies them to the ongoing simulation, completing the feedback loop.

The simulation environment computing system 300 of the simulation and decision platform 100 plays a crucial role in enabling continuous, scalable, and real-time simulations that can adapt to the evolving needs of the system being modeled. By leveraging distributed computing frameworks, streaming data processing, and seamless integration with the AI component, simulation environment computing platform 300 provides a robust and efficient infrastructure for running complex simulations and reducing epistemic uncertainty.

Figure 11:
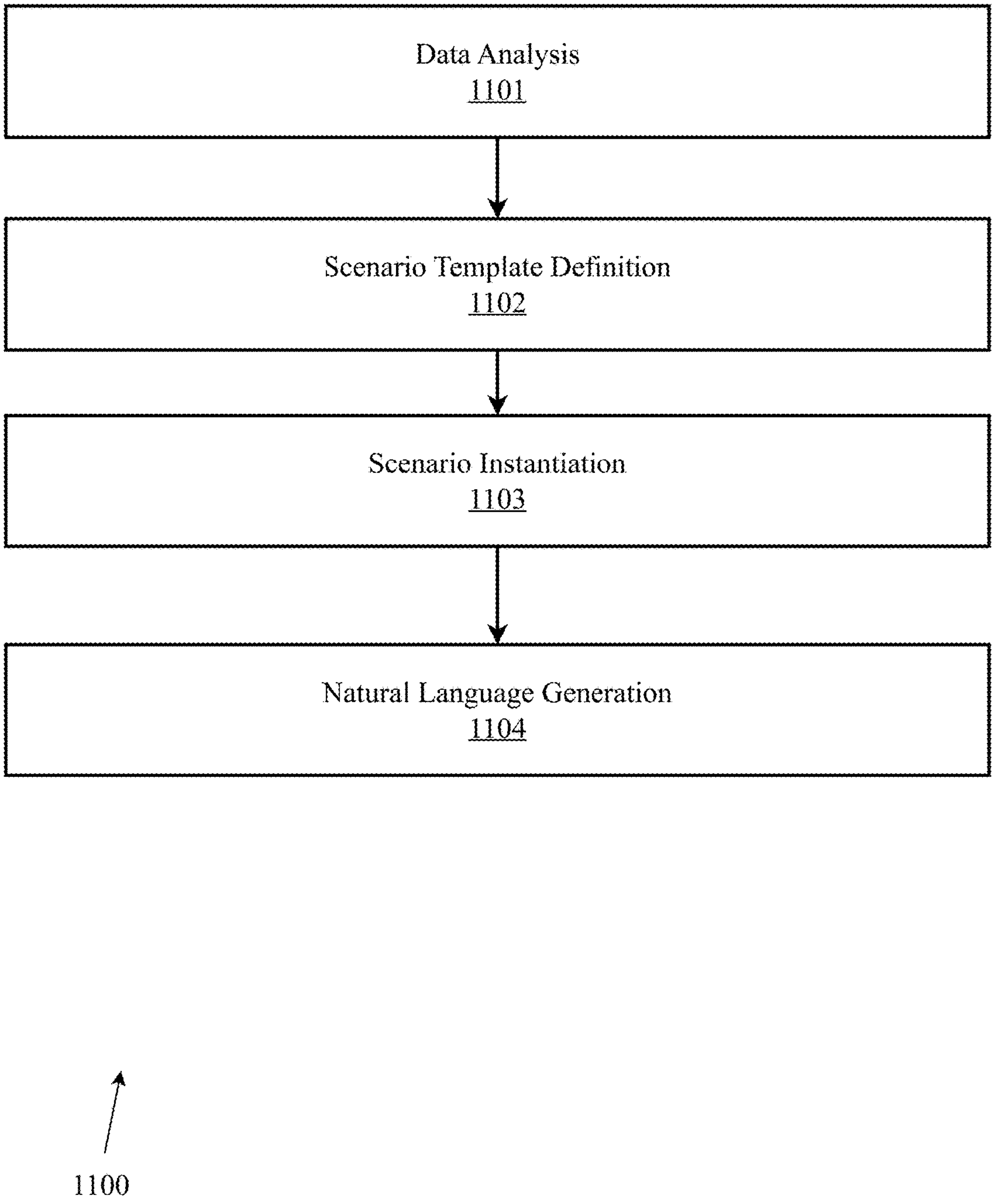
FIG. 11 is a flow diagram illustrating an exemplary method for producing human-readable scenario generation, according to an embodiment.

FIG. 11 is a flow diagram illustrating an exemplary method 1100 for producing human-readable scenario generation, according to an embodiment. This method may be performed by a scenario generation computing system 400. According to the embodiment, the process begins at step 1101 with data analysis. The historical data is analyzed using machine learning techniques, such as clustering, association rule mining, or decision trees, to identify patterns, relationships, and key influencing factors. At step 1102 a scenario template is defined, specifying the structure and format of the human-readable scenarios. This template includes placeholders for relevant variables, such as (using the grocery store example) day, time, customer arrival rate, popular product categories, and staff allocation. Scenario instantiation is performed at step 1103. The identified patterns and relationships are used to instantiate the scenario template, filling in the placeholders with specific values based on the historical data and domain knowledge. At step 1104 natural language generation is performed. The instantiated scenarios are transformed into human-readable descriptions using natural language generation techniques, such as template-based or rule-based approaches. This may comprise mapping the structured scenario data to natural language sentences and paragraphs.

Figure 12:
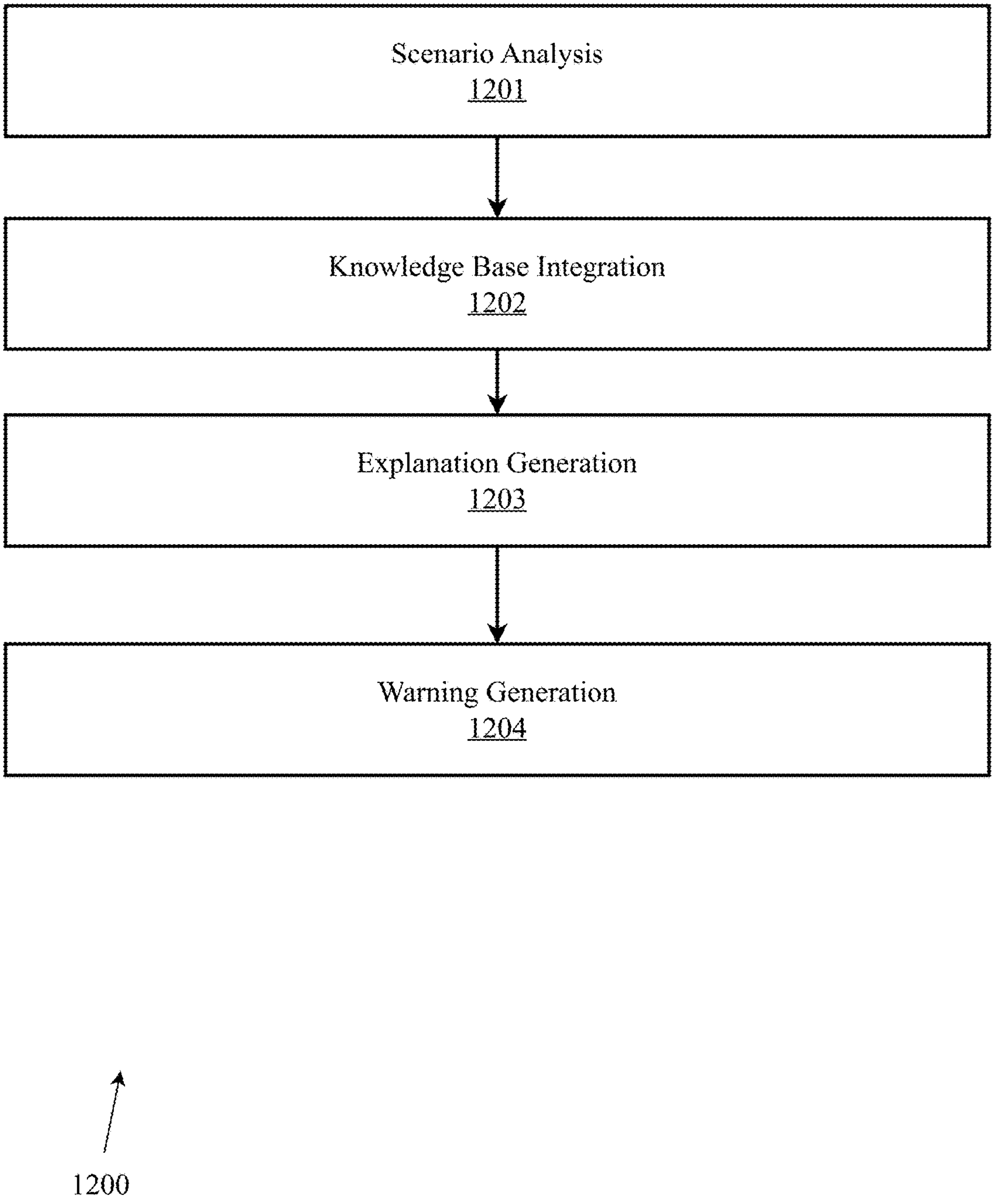
FIG. 12 is a flow diagram illustrating an exemplary method for providing contextual explanations, recommendations, and/or warnings, according to an embodiment.

FIG. 12 is a flow diagram illustrating an exemplary method 1200 for providing contextual explanations, recommendations, and/or warnings, according to an embodiment.

This method may be performed by a scenario generation computing system 400. According to the embodiment, the process begins at step 1201 by performing scenario analysis. The generated scenarios are analyzed to identify key factors, trends, and potential issues that may impact the system's performance or outcomes. At step 1202 platform integrates with existing knowledge bases and/or domain specific expert knowledge. The scenario generation computing system 400 can integrate with a knowledge base that contains domain-specific information, best practices, and expert insights. This knowledge base is used to provide context and guidance based on the identified factors and trends. At step 1203 the platform generates an explanation. Based on the scenario analysis and knowledge base integration, the system generates explanations that highlight the key influences, potential consequences, and recommended actions. These explanations may be generated using natural language generation techniques, such as template-based, rule-based approaches and using LLMs or other generative models. At step 1204 the platform generates a warning. If the scenario analysis reveals potential risks or issues, the system generates warnings to alert users and provide proactive guidance. These warnings may be generated based on predefined risk thresholds, domain-specific rules, or machine learning models trained on historical data.

Figure 13:
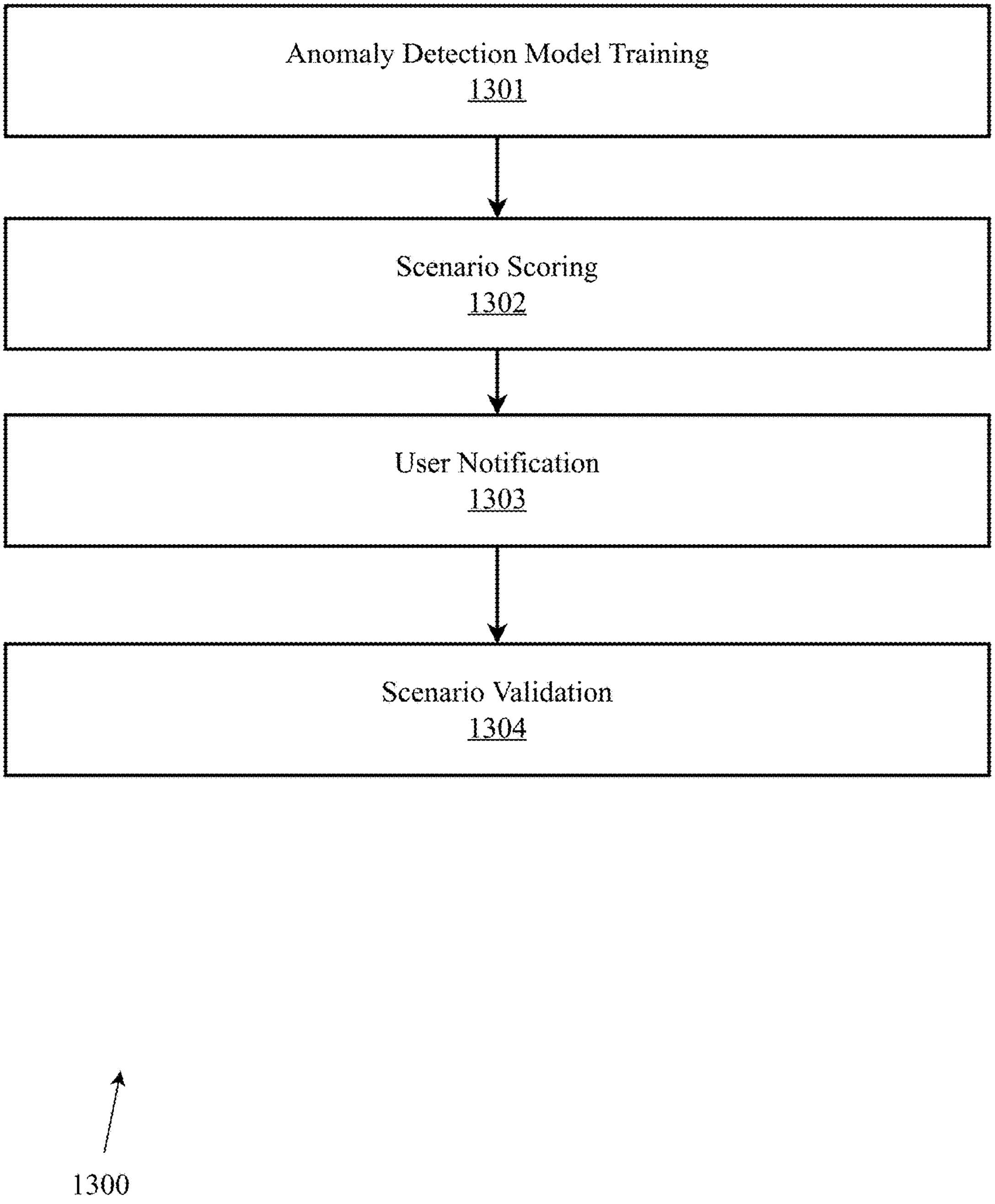
FIG. 13 is a flow diagram illustrating an exemplary method for providing anomaly detection and scenario validation, according to an embodiment.

FIG. 13 is a flow diagram illustrating an exemplary method 1300 for providing anomaly detection and scenario validation, according to an embodiment. This method may be performed by a scenario generation computing system 400. According to the embodiment, the process begins at step 1301 by training an anomaly detection model. An anomaly detection model, such as, for example, an autoencoder or isolation forest, may be trained on the historical data to learn the normal patterns and behaviors of the system. At step 1302 platform performs scenario scoring wherein each generated scenario is scored using the trained anomaly detection model to assess its deviation from the normal patterns. Scenarios that receive high anomaly scores may be flagged as potential anomalies. At step 1303 the platform creates a user notification. If an anomaly is detected, scenario generation computing system 400 notifies the user, providing details about the anomalous scenario and requesting further validation or investigation. Scenario validation is performed at step 1304. The user can review the flagged scenarios and provide feedback on their validity or feasibility. This feedback can be used to refine the anomaly detection model and improve the scenario generation process over time.

The scenario generation and guidance computing system 400 of the simulation and decision platform 100 supports creating realistic and informative scenarios, providing explanations and warnings, and detecting anomalies to support decision-making. By leveraging explainable AI techniques, natural language processing, and anomaly detection, this system and methods enhance the interpretability and reliability of the generated scenarios.

Figure 14:
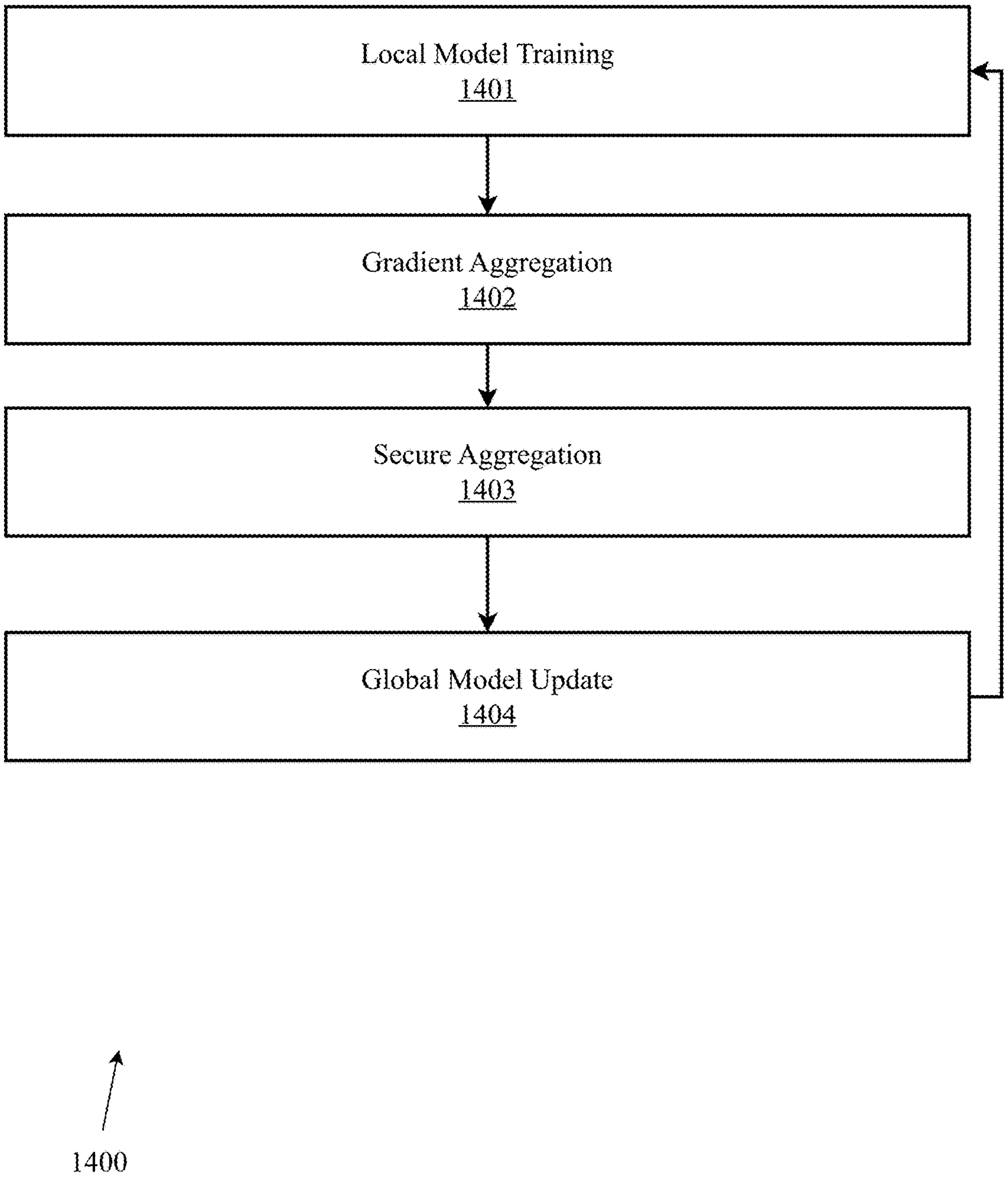
FIG. 14 is a flow diagram illustrating an exemplary method for providing federated learning to preserve data security and regulatory compliance, according to an embodiment.

FIG. 14 is a flow diagram illustrating an exemplary method 1400 for providing federated learning to preserve data security and regulatory compliance, according to an embodiment. This method may be performed by model training and optimization computing system 500. According to the embodiment, the process begins at step 1401 by training a local model. Continuing the grocery store example, each participating store trains a local model using its own customer data. The local models are trained on the same model architecture and hyperparameters as a global model. Gradient aggregation is performed at step 1402. Instead of sharing the raw data, each store computes the gradients (i.e., the direction and magnitude of model updates) based on its local training. These gradients are then securely transmitted to a central server such as simulation and decision platform 100. At step 1403 secure aggregation is performed wherein the central server receives the gradients from all participating stores and performs secure aggregation using techniques like secure multi-party computation or homomorphic encryption. This ensures that the individual gradients are not exposed and only the aggregated update is computed. At step 1404 the global model parameters are updated using the aggregated gradients. The updated global model is then distributed back to the participating stores. Steps 1401-1404 are repeated for multiple rounds until the global model converges or a desired level of performance is achieved. Federated learning helps in training accurate models while maintaining data privacy and security. It enables the simulation and decision platform 100 to leverage data from multiple sources without the need for direct data sharing.

Figure 15:
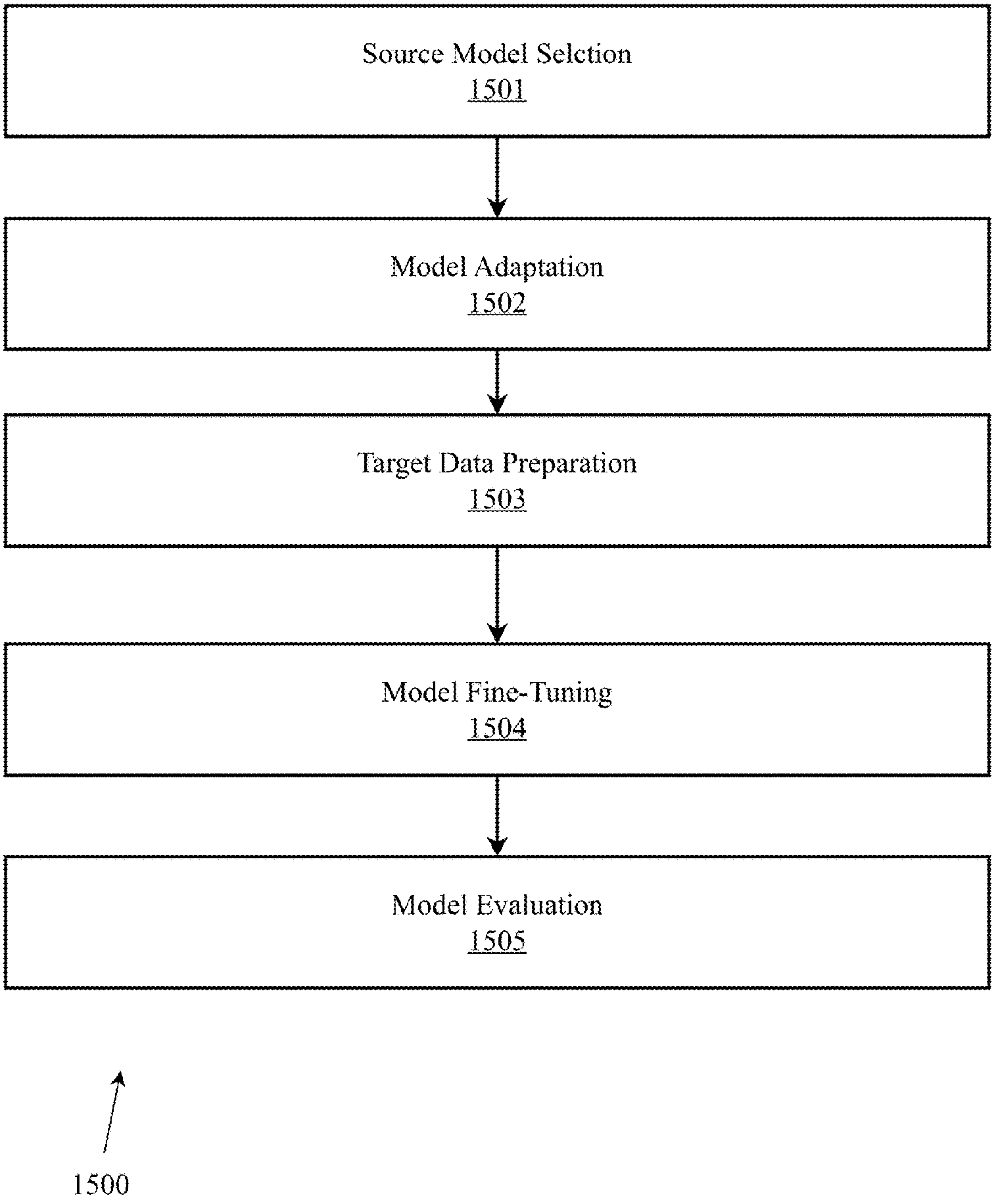
FIG. 15 is a flow diagram illustrating an exemplary method for transfer learning to adapt a model to a specific context, according to an embodiment.

FIG. 15 is a flow diagram illustrating an exemplary method 1500 for transfer learning to adapt a model to a specific context, according to an embodiment. This method may be performed by model training and optimization computing system 500. According to the embodiment, the process begins at step 1501 by selecting a source model. A pre-trained model that is relevant to the target task is selected. In the exemplary grocery store use case, a customer segmentation model may be trained on a related retail dataset. Model adaptation occurs at step 1502. The pre-trained model is fine-tuned or adapted to the specific characteristics of the simulation. This may involve modifying the model architecture, updating the output layer, or adjusting the hyperparameters. At step 1503 the target data is prepared. A smaller dataset from the relevant domain is prepared to be used for fine-tuning the pre-trained model. This dataset should be representative of the target task and may include labeled examples of customer segments specific to the grocery store for example. Platform can support model tine-tuning at step 1504. The pre-trained model is fine-tuned using the prepared target dataset. The model may be trained for a few iterations or epochs, allowing it to adapt its learned features to the grocery store domain. As a last step 1505 platform evaluates the fine-tuned model. The fine-tuned model is evaluated on a separate test set from the relevant (e.g., grocery store) domain to assess its performance and generalization ability. Transfer learning allows the simulation and decision platform 100 to leverage existing knowledge and reduce the time and data requirements for training new models. It is particularly useful when the available data for the target task is limited or when there are similarities between the source and target domains.

Figure 16:
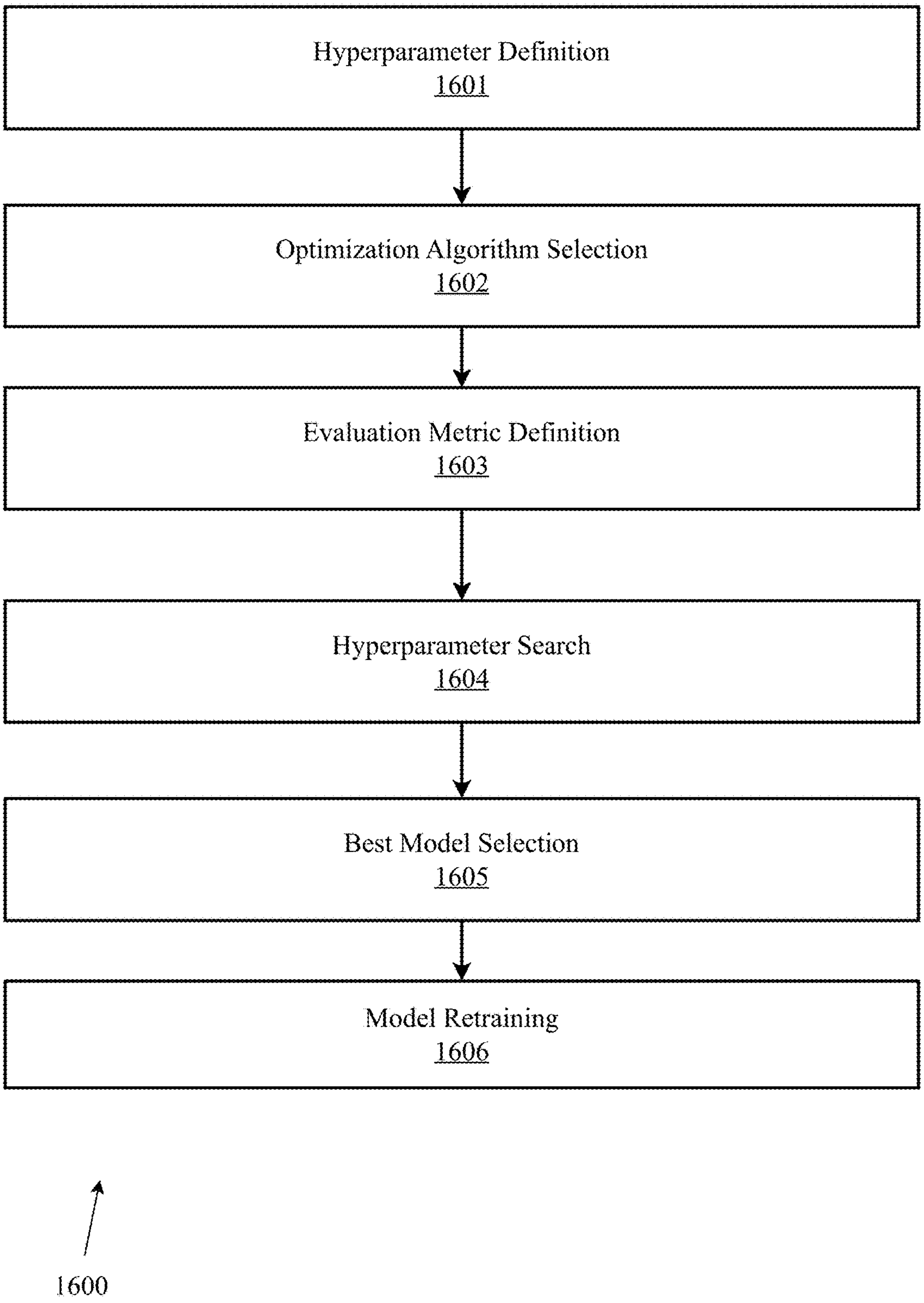
FIG. 16 is a flow diagram illustrating an exemplary method for model optimization, according to an embodiment.

FIG. 16 is a flow diagram illustrating an exemplary method 1600 for model optimization, according to an embodiment. This method may be performed by model training and optimization computing system 500. According to the embodiment, the process begins at step 1601 by defining the hyperparameters to be optimized. The hyperparameters to be optimized are defined, such as, for example, learning rate, batch size, regularization strength, and/or network architecture. Optimization algorithm selection occurs at step 1602. An optimization algorithm is selected, such as grid search, random search, or Bayesian optimization. These algorithms systematically explore the hyperparameter space to find the best combination of values. At step 1603 platform 100 defines an evaluation metric. An evaluation metric is defined to assess the performance of the model, such as accuracy, F1 score, or mean squared error. This metric serves as the objective function to be optimized. At step 1604 platform 100 performs a hyperparameter search. The selected optimization algorithm is used to search through the hyperparameter space. Each combination of hyperparameters is used to train and evaluate the model using the defined evaluation metric. A best model is selected at step 1605. The hyperparameter combination that yields the best performance according to the evaluation metric is selected as the optimal configuration. As a last step 1606 platform performs model retraining as needed. The model is retrained using the optimal hyperparameters on the full training dataset to obtain the final optimized model. Model optimization helps in improving the performance and efficiency of the machine learning models used in the simulation and decision platform 100. It ensures that the models are well-tuned and can provide accurate predictions and insights for decision-making.

Figure 17:
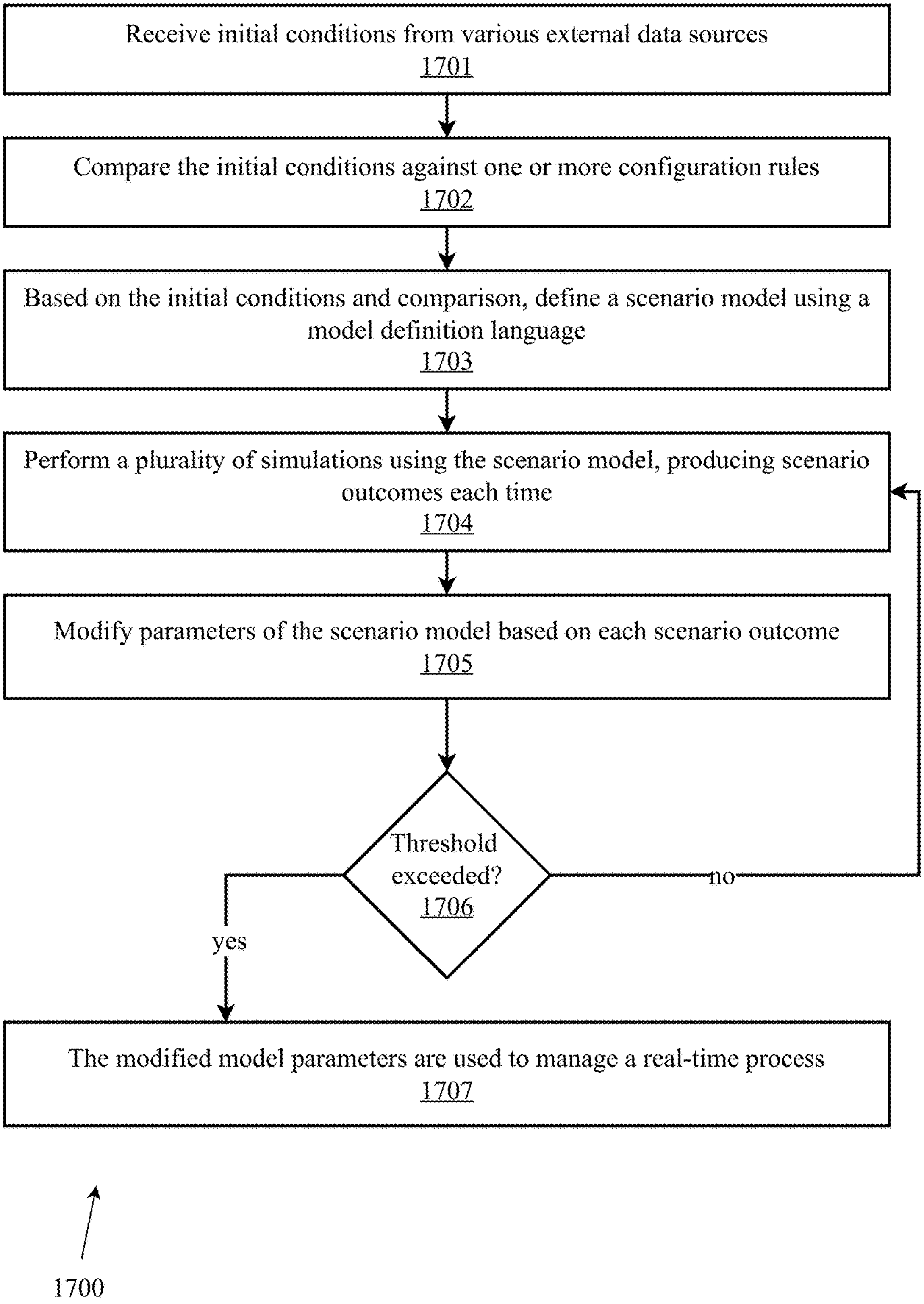
FIG. 17 is a flow diagram illustrating an exemplary method for using a wide range of data sources and advanced modeling and simulation techniques to iteratively refine models and reduce epistemic uncertainty about real-world systems and processes, according to an embodiment.

FIG. 17 is a flow diagram illustrating an exemplary method 1700 for using a wide range of data sources and advanced modeling and simulation techniques to iteratively refine models and reduce epistemic uncertainty about real-world systems and processes, according to an embodiment. This method may be performed by one or more platform 100 systems or subsystems such as DCG computing system 102, data filtering computing system 101, and/or model training and optimization computing system 500. According to the embodiment, the process begins at step 1701 when platform receives initial conditions from various external data sources 110. Platform may then compare these initial conditions against one or more configuration rules at step 1702. Based on the initial conditions and comparison, platform 100 defines a scenario model using a model definition language at step 1703. At a next step 1704 platform iteratively performs simulations using the scenario model, producing scenario outcomes for each simulation. The parameters of the scenario model are modified based on each scenario outcome at step 1705. This iterative simulation process continues until a scenario outcome exceeds some threshold at check 1706. As a last step 1707, the modified model parameters are sent to a distributed computational graph 102 which uses them to manage a real-time process. The distributed computational graph can also feed back previously processed parameters to be used as initial conditions for new simulations.

For more information regarding the execution of method 1700 please refer to U.S. patent application Ser. No. 15/813,097 which is incorporated herein by reference.

Exemplary Computing Environment

Figure 18:
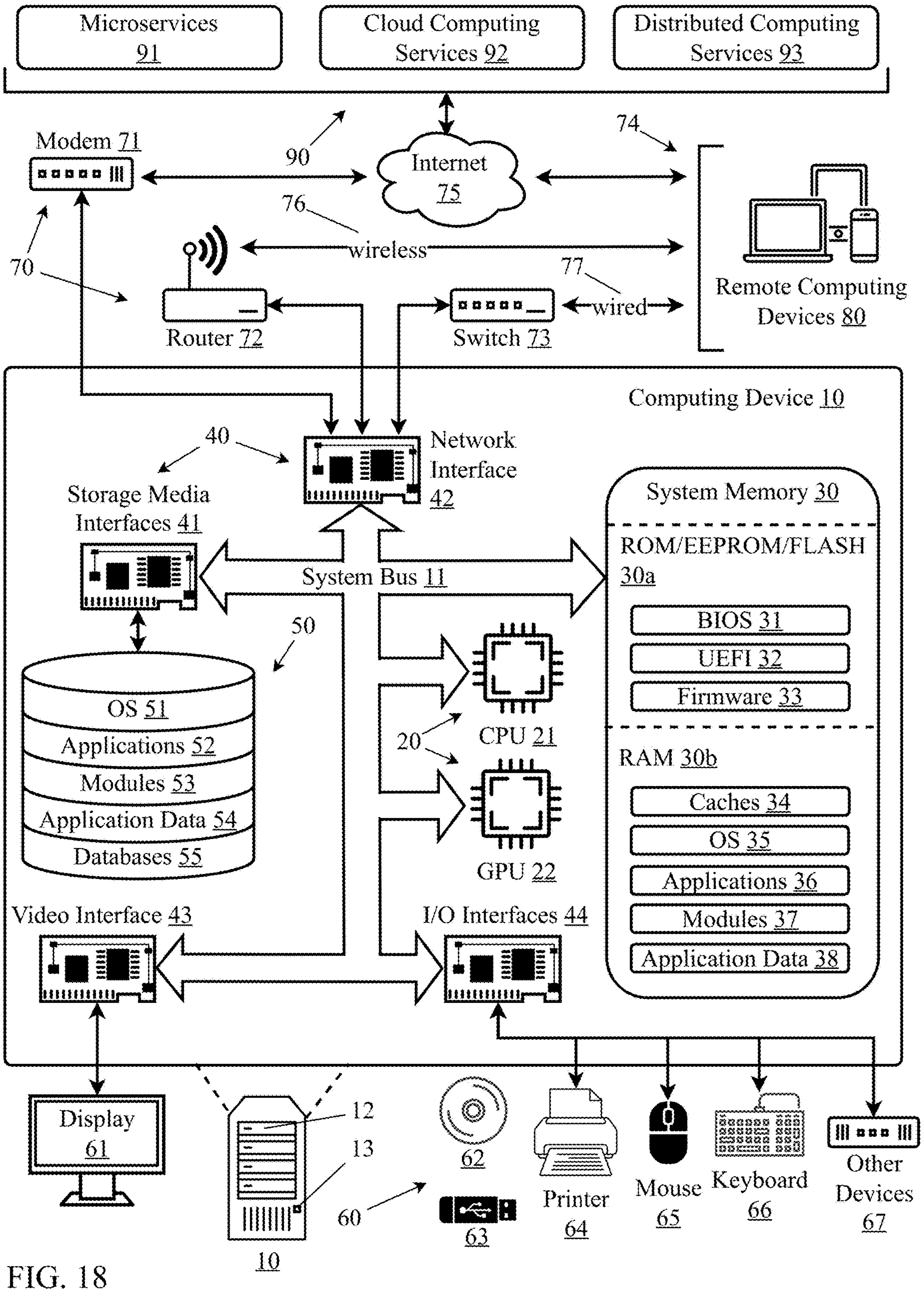
FIG. 18 illustrates an exemplary computing environment on which an embodiment described herein may be implemented.

FIG. 18 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for artificial intelligence-driven simulation, comprising:

one or more hardware processors configured for:

generating a model of a real-world system based on streaming data received from one or more entities of the real-world system;

generating and running a simulation of the real-world system with one or more simulation scenarios using the model of the real-world system, wherein the simulation scenarios are defined based on objectives and constraints provided by a user or an artificial intelligence agent, and iteratively adjusting parameters of the simulation using machine learning or artificial intelligence techniques to optimize outcomes of the simulation scenarios, wherein the simulation scenarios, objectives, and constraints are defined using a model definition language;

performing real-time monitoring of the real-world system based on the streaming data, and adapting the model of the real-world system based on evolving real-world conditions and user, expert, or group feedback;

generating a machine-interpretable or human-interpretable plan based on results of the simulation, employing explainable artificial intelligence techniques to facilitate understanding and decision-making or downstream actions;

integrating with external data sources, machine learning models, and domain-specific knowledge bases to enhance the accuracy, relevance, and utility of outcomes of the simulation scenarios; and quantifying and reducing the epistemic uncertainty associated with the simulation of the real-world system by employing probabilistic reasoning, targeted exploration, and continuous learning from both simulated or synthetic data and real-world data;

wherein optimizing the outcomes of the simulation scenarios is performed using symbolic artificial intelligence or connectionist artificial intelligence.

2. The computing system of claim 1, wherein the one or more hardware processors are further configured for validating the one or more simulation scenarios using probabilistic programming languages, rules, agent policies and personas, population generation, generative models, such as Generative Adversarial Networks (GANs), Variational Autoencoders (VAEs), Large Language Models, or Diffusion models, to ensure scenario diversity, realism, and coverage of key system behaviors.

3. The computing system of claim 1, wherein the explainable artificial intelligence techniques comprise one or more of: feature importance analysis, counterfactual explanations, rule-based reasoning, and visual analytics.

4. The computing system of claim 1, wherein the one or more hardware processors are further configured for detecting anomalies, outliers, and edge cases in the results of the simulation using unsupervised learning algorithms, such as clustering, anomaly detection, or mutual information gain, to identify potential risks, opportunities, areas of improvement, or impact.

5. The computing system of claim 1, wherein the one or more hardware processors are further configured for:

ingesting and preprocessing external data from sources including sensors, databases, application programming interfaces, or user input;

aligning and fusing the external data with the model's internal state representation;

validating and updating the model's assumptions, parameters, states of interest, state transitions, and constraints based on the external data; and exchanging data and insights with external machine learning models or knowledge bases.

6. The computing system of claim 1, wherein the one or more hardware processors are further configured for assisting users in setting up, configuring, and interpreting the simulation scenarios and results through an interactive user interface that provides guided workflows, contextual help, and natural language processing capabilities.

7. The computing system of claim 1, wherein the quantification and reduction of epistemic uncertainty comprises:

representing the uncertainty in the model's parameters, structure, and predictions using probability distributions or fuzzy sets;

updating the uncertainty estimates based on the results of the simulation and real-world data using Bayesian inference or belief propagation;

identifying the most informative scenarios to run using active learning, Bayesian optimization, or information-theoretic measures; and adapting the model's complexity, granularity, or scope based on the uncertainty reduction goals and computational constraints.

8. The computing system of claim 1, wherein the one or more hardware processors are further configured for enabling collaborative development, sharing, and reuse of the simulation scenarios, the models, and insights from the simulation across multiple users, domains, and organizations, while ensuring data privacy, security, and compliance with relevant regulations and policies.

9. The computing system of claim 1, wherein the system is deployed on a distributed computing infrastructure including cloud platforms or high-performance computing clusters, to enable scalable, fault-tolerant, and efficient execution of complex simulation workloads.

10. The computing system of claim 1, wherein the one or more hardware processors are further configured for generating executable robot plans.

11. The computing system of claim 1, wherein the one or more hardware processors are further configured for:

dynamically modulating forward search methods and selecting appropriate look ahead depth and branching factors based on current system state, current system objectives, and available resources; and conducting trajectory optimization identification.

12. The computing system of claim 1, wherein the one or more hardware processors are further configured for suggesting analytical formulations or proofs for equations that describe relationships between simulated and observed entities and phenomena.

13. A computer-implemented method for artificial intelligence-driven simulation, the computer-implemented method comprising:

generating a model of a real-world system based on streaming data received from one or more entities of the real-world system;

generating and running a simulation of the real-world system with one or more simulation scenarios using the model of the real-world system, wherein the simulation scenarios are defined based on objectives and constraints provided by a user or an artificial intelligence agent, and iteratively adjusting parameters of the simulation using machine learning or artificial intelligence techniques to optimize outcomes of the simulation scenarios, wherein the simulation scenarios, objectives, and constraints are defined using a model definition language;

performing real-time monitoring of the real-world system based on the streaming data, and adapting the model of the real-world system based on evolving real-world conditions and user, expert, or group feedback;

generating a machine-interpretable or human-interpretable plan based on results of the simulation, employing explainable artificial intelligence techniques to facilitate understanding and decision-making or downstream actions;

integrating with external data sources, machine learning models, and domain-specific knowledge bases to enhance the accuracy, relevance, and utility of outcomes of the simulation scenarios; and quantifying and reducing the epistemic uncertainty associated with the simulation of the real-world system by employing probabilistic reasoning, targeted exploration, and continuous learning from both simulated or synthetic data and real-world data;

wherein optimizing the outcomes of the simulation scenarios is performed using symbolic artificial intelligence or connectionist artificial intelligence.

14. The computer-implemented method of claim 13, further comprising validating the one or more simulation scenarios using probabilistic programming languages, rules, agent policies and personas, population generation, generative models, such as Generative Adversarial Networks (GANs), Variational Autoencoders (VAEs), Large Language Models, or Diffusion models, to ensure scenario diversity, realism, and coverage of key system behaviors.

15. The computer-implemented method of claim 13, wherein the explainable artificial intelligence techniques comprise one or more of: feature importance analysis, counterfactual explanations, rule-based reasoning, and visual analytics.

16. The computer-implemented method of claim 13, further comprising detecting anomalies, outliers, and edge cases in the results of the simulation using unsupervised learning algorithms, such as clustering, anomaly detection, or mutual information gain, to identify potential risks, opportunities, areas of improvement, or impact.

17. The computer-implemented method of claim 13, further comprising:

ingesting and preprocessing external data from sources including sensors, databases, application programming interfaces, or user input;

aligning and fusing the external data with the model's internal state representation;

validating and updating the model's assumptions, parameters, states of interest, state transitions, and constraints based on the external data; and exchanging data and insights with external machine learning models or knowledge bases.

18. The computer-implemented method of claim 13, further comprising assisting users in setting up, configuring, and interpreting the simulation scenarios and results through an interactive user interface that provides guided workflows, contextual help, and natural language processing capabilities.

19. The computer-implemented method of claim 13, further comprising:

representing the uncertainty in the model's parameters, structure, and predictions using probability distributions or fuzzy sets;

updating the uncertainty estimates based on the results of the simulation and real-world data using Bayesian inference or belief propagation;

identifying the most informative scenarios to run using active learning, Bayesian optimization, or information-theoretic measures; and adapting the model's complexity, granularity, or scope based on the uncertainty reduction goals and computational constraints.

20. The computer-implemented method of claim 13, further comprising enabling collaborative development, sharing, and reuse of the simulation scenarios, the models, and insights from the simulation across multiple users, domains, and organizations, while ensuring data privacy, security, and compliance with relevant regulations and policies.

21. The computer-implemented method of claim 13, wherein the computer-implemented method is performed on a distributed computing infrastructure, such as cloud platforms or high-performance computing clusters, to enable scalable, fault-tolerant, and efficient execution of complex simulation workloads.

22. The computer-implemented method of claim 13, wherein the one or more hardware processors are further configured for generating executable robot plans.

23. The computer-implemented method of claim 13, further comprising:

dynamically modulating forward search methods and selecting appropriate look ahead depth and branching factors based on current system state, current system objectives, and available resources; and conducting trajectory optimization identification.

24. The computer-implemented method of claim 13, further comprising suggesting analytical formulations or proofs for equations that describe relationships between simulated and observed entities and phenomena.

25. A system for artificial intelligence-driven simulation, comprising one or more computers with executable instructions that, when executed, cause the system to:

generate a model of a real-world system based on streaming data received from one or more entities of the real-world system;

generate and run a simulation of the real-world system with one or more simulation scenarios using the model of the real-world system, wherein the simulation scenarios are defined based on objectives and constraints provided by a user-or an artificial intelligence agent, and iteratively adjust parameters of the simulation using machine learning or artificial intelligence techniques to optimize outcomes of the simulation scenarios, wherein the simulation scenarios, objectives, and constraints are defined using a model definition language;

perform real-time monitoring of the real-world system based on the streaming data, and adapt the model of the real-world system based on evolving real-world conditions and user, expert, or group feedback;

generate a machine-interpretable or human-interpretable plan based on results of the simulation, employing explainable artificial intelligence techniques to facilitate understanding and decision-making or downstream actions;

integrate with external data sources, machine learning models, and domain-specific knowledge bases to enhance the accuracy, relevance, and utility of outcomes of the simulation scenarios; and quantify and reduce the epistemic uncertainty associated with the of the real-world system by employing probabilistic reasoning, targeted exploration, and continuous learning from both simulated or synthetic data and real-world data;

wherein optimizing the outcomes of the simulation scenarios is performed using symbolic artificial intelligence or connectionist artificial intelligence.

26. The system of claim 25, wherein the system is further caused to validate the one or more simulation scenarios using probabilistic programming languages, rules, agent policies and personas, population generation, generative models, such as Generative Adversarial Networks (GANs), Variational Autoencoders (VAEs), Large Language Models, or Diffusion models, to ensure scenario diversity, realism, and coverage of key system behaviors.

27. The system of claim 25, wherein the explainable artificial intelligence techniques comprise one or more of: feature importance analysis, counterfactual explanations, rule-based reasoning, and visual analytics.

28. The system of claim 25, wherein the system is further caused to detect anomalies, outliers, and edge cases in the results of the simulation using unsupervised learning algorithms, such as clustering, anomaly detection, or mutual information gain, to identify potential risks, opportunities, areas of improvement, or impact.

29. The system of claim 25, wherein the system is further caused to:

ingest and preprocess external data from sources including sensors, databases, application programming interfaces, or user input;

align and fusing the external data with the model's internal state representation;

validate and update the model's assumptions, parameters, states of interest, state transitions, and constraints based on the external data; and exchange data and insights with external machine learning models or knowledge bases.

30. The system of claim 25, wherein the system is further caused to assist users in setting up, configuring, and interpreting the simulation scenarios and results through an interactive user interface that provides guided workflows, contextual help, and natural language processing capabilities.

31. The system of claim 25, wherein the system is further caused to:

represent the uncertainty in the model's parameters, structure, and predictions using probability distributions or fuzzy sets;

update the uncertainty estimates based on the results of the simulation and real-world data using Bayesian inference or belief propagation;

identify the most informative scenarios er to run using active learning, Bayesian optimization, or information-theoretic measures; and adapt the model's complexity, granularity, or scope based on the uncertainty reduction goals and computational constraints.

32. The non-transitory, computer-readable storage media of claim 31, wherein the one or more hardware processors are further configured for generating executable robot plans.

33. The system of claim 25, wherein the system is further caused to enable collaborative development, sharing, and reuse of the simulation scenarios, the models, and insights from the simulation across multiple users, domains, and organizations, while ensuring data privacy, security, and compliance with relevant regulations and policies.

34. The system of claim 25, wherein the system is deployed on a distributed computing infrastructure including cloud platforms or high-performance computing clusters, to enable scalable, fault-tolerant, and efficient execution of complex simulation workloads.

35. The system of claim 25, wherein the one or more hardware processors are further configured for generating executable robot plans.

36. The system of claim 25, wherein the one or more hardware processors are further configured for:

dynamically modulate forward search methods and select appropriate look ahead depth and branching factors based on current system state, current system objectives, and available resources; and conduct trajectory optimization identification.

37. The system of claim 25, wherein the one or more hardware processors are further configured for suggest analytical formulations or proofs for equations that describe relationships between simulated and observed entities and phenomena.

38. Non-transitory, computer-readable storage media having computer-executable instructions embodied thereon that, when executed by one or more processors of a computing system for artificial intelligence-driven simulation, cause the computing system to:

generate a model of a real-world system based on streaming data received from one or more entities of the real-world system;

generate and run a simulation of the real-world system with one or more simulation scenarios using the model of the real-world system, wherein the simulation scenarios are defined based on objectives and constraints provided by a user-or an artificial intelligence agent, and iteratively adjust parameters of the simulation using machine learning or artificial intelligence techniques to optimize outcomes of the simulation scenarios, wherein the simulation scenarios, objectives, and constraints are defined using a model definition language;

perform real-time monitoring of the real-world system based on the streaming data, and adapting the model of the real-world system based on evolving real-world conditions and user, expert, or group feedback;

generate a machine-interpretable or human-interpretable plan based on results of the simulation, employing explainable artificial intelligence techniques to facilitate understanding and decision-making or downstream actions;

integrate with external data sources, machine learning models, and domain-specific knowledge bases to enhance the accuracy, relevance, and utility of outcomes of the simulation scenarios; and quantify and reduce the epistemic uncertainty associated with the simulation of the real-world system by employing probabilistic reasoning, targeted exploration, and continuous learning from both simulated or synthetic data and real-world data;

wherein optimizing the outcomes of the simulation scenarios is performed using symbolic artificial intelligence or connectionist artificial intelligence.

39. The non-transitory, computer-readable storage media of claim 38, wherein the computing system is further caused to validate the one or more simulation scenarios using probabilistic programming languages, rules, agent policies and personas, population generation, generative models, such as Generative Adversarial Networks (GANs), Variational Autoencoders (VAEs), Large Language Models, or Diffusion models, to ensure scenario diversity, realism, and coverage of key system behaviors.

40. The non-transitory, computer-readable storage media of claim 38, wherein the explainable artificial intelligence techniques comprise one or more of: feature importance analysis, counterfactual explanations, rule-based reasoning, and visual analytics.

41. The non-transitory, computer-readable storage media of claim 38, wherein the computing system is further caused to detect anomalies, outliers, and edge cases in the results of the simulation using unsupervised learning algorithms, such as clustering, anomaly detection, or mutual information gain, to identify potential risks, opportunities, areas of improvement, or impact.

42. The non-transitory, computer-readable storage media of claim 38, wherein the computing system is further caused to:

ingest and preprocess external data from sources including sensors, databases, application programming interfaces, or user input;

align and fusing the external data with the model's internal state representation;

validate and update the model's assumptions, parameters, states of interest, state transitions, and constraints based on the external data; and exchange data and insights with external machine learning models or knowledge bases.

43. The non-transitory, computer-readable storage media of claim 38, wherein the computing system is further caused to assist users in setting up, configuring, and interpreting the simulation scenarios and results through an interactive user interface that provides guided workflows, contextual help, and natural language processing capabilities.

44. The non-transitory, computer-readable storage media of claim 38, wherein the computing system is further caused to:

represent the uncertainty in the model's parameters, structure, and predictions using probability distributions or fuzzy sets;

update the uncertainty estimates based on the results of the simulation and real-world data using Bayesian inference or belief propagation;

identify the most informative scenarios to run using active learning, Bayesian optimization, or information-theoretic measures; and adapt the model's complexity, granularity, or scope based on the uncertainty reduction goals and computational constraints.

45. The non-transitory, computer-readable storage media of claim 38, wherein the computing system is further caused to enable collaborative development, sharing, and reuse of the simulation scenarios, the models, and insights from the simulation across multiple users, domains, and organizations, while ensuring data privacy, security, and compliance with relevant regulations and policies.

46. The non-transitory, computer-readable storage media of claim 38, wherein the system is deployed on a distributed computing infrastructure, such as cloud platforms or high-performance computing clusters, to enable scalable, fault-tolerant, and efficient execution of complex simulation workloads.

47. The non-transitory, computer-readable storage media of claim 38, wherein the one or more hardware processors are further configured for:

dynamically modulate forward search methods and select appropriate look ahead depth and branching factors based on current system state, current system objectives, and available resources; and conduct trajectory optimization identification.

48. The non-transitory, computer-readable storage media of claim 38, wherein the one or more hardware processors are further configured for suggest analytical formulations or proofs for equations that describe relationships between simulated and observed entities and phenomena.

* * * * *